US012768681B2

(12) United States Patent
Kishida et al.

(10) Patent No.: US 12,768,681 B2
(45) Date of Patent: Oct. 20, 2026

(54) RAYLEIGH INTENSITY PATTERN MEASUREMENT DEVICE AND RAYLEIGH INTENSITY PATTERN MEASUREMENT METHOD

(71) Applicant: NEUBREX CO., LTD., Kobe (JP)

(72) Inventors: Kinzo Kishida, Kobe (JP); Yahei Koyamada, Kobe (JP); Kenichi Nishiguchi, Kobe (JP); Daiji Azuma, Kobe (JP); Che-Hsien Li, Kobe (JP)

(73) Assignee: Neubrex Co., Ltd., Kobe (JP)

( * ) Notice: Subject to any disclaimer, the term of this patent is extended or adjusted under 35 U.S.C. 154(b) by 219 days.

(21) Appl. No.: 18/684,804

(22) PCT Filed: Oct. 6, 2021

(86) PCT No.: PCT/JP2021/037005
§ 371 (c)(1),
(2) Date: Feb. 19, 2024

(87) PCT Pub. No.: WO2023/058160
PCT Pub. Date: Apr. 13, 2023

(65) Prior Publication Data
US 2024/0361159 A1 Oct. 31, 2024

(51) Int. Cl.
*G01D 5/353* (2006.01)

(52) U.S. Cl.
CPC ................................ *G01D 5/35361* (2013.01)

(58) Field of Classification Search
CPC . G01D 5/35361; G01K 11/32; G01M 5/0091; G01M 11/083
See application file for complete search history.

(56) References Cited

U.S. PATENT DOCUMENTS 7,440,087 B2 10/2008 Froggatt et al.
2011/0228255 A1 9/2011 Li et al.
(Continued)

FOREIGN PATENT DOCUMENTS

JP 2009042005 A 2/2009
JP 2011232138 A 11/2011
(Continued)

OTHER PUBLICATIONS

Office Action (Notice of Reasons for Refusal) issued on Jan. 7, 2025, in corresponding Japanese Patent Application No. 2023-552604 and machine English translation of the Office Action. (8 pages).
(Continued)

*Primary Examiner* — Michelle M Iacoletti
*Assistant Examiner* — Maher Yazback
(74) *Attorney, Agent, or Firm* — Buchanan Ingersoll & Rooney PC

(57) ABSTRACT

A Rayleigh intensity pattern measurement device includes: a tunable-wavelength LD (1); an optical coupler; a reception unit which receives coherent light from the tunable-wavelength LD and the Rayleigh scattering light; and an RIP digital processing unit which receives an output signal from the reception unit by an A/D converter, calculates a cross-correlation coefficient from two different Rayleigh intensity pattern signals obtained from the Rayleigh scattering light, and stores a cross-correlation coefficient obtained from a result of comparison with a given threshold. If the compared cross-correlation coefficient is smaller than the threshold, the cross-correlation coefficient is calculated until becoming equal to or greater than the threshold, and Rayleigh frequency shift is calculated from the cross-correlation coefficient that has become equal to or greater than the threshold,
(Continued)

whereby a strain distribution or a temperature distribution of a measurement target is measured.

13 Claims, 34 Drawing Sheets

(56) References Cited

U.S. PATENT DOCUMENTS

| | | | | |
|---|---|---|---|---|
| 2015/0285626 | A1 | 10/2015 | Yamauchi et al. | |
| 2017/0248448 | A1 | 8/2017 | Horiguchi | |
| 2019/0049273 | A1 | 2/2019 | Kinzo et al. | |
| 2020/0370950 | A1* | 11/2020 | Ip | G01B 9/02015 |
| 2020/0408572 | A1* | 12/2020 | Ronnekleiv | G01D 5/35306 |
| 2021/0247563 | A1* | 8/2021 | Kremp | G01B 11/18 |
| 2021/0359755 | A1* | 11/2021 | Rochat | G01M 11/3172 |

FOREIGN PATENT DOCUMENTS

| | | | |
|---|---|---|---|
| JP | 6552983 | B2 | 7/2019 |
| WO | 2010061718 | A1 | 6/2010 |
| WO | 2014083989 | A1 | 6/2014 |

OTHER PUBLICATIONS

Chen et al.,"Fiber-optic distributed acoustic sensor based on a chirped pulse and a non-matched filter", Optics Express 29415, vol. 27, No. 20, Sep. 30, 2019.

International Search Report (PCT/ISA/210) with translation and Written Opinion (PCT/ISA/237) mailed on Dec. 14, 2021, by the Japan Patent Office as the International Searching Authority for International Application No. PCT/JP2021/037005. (10 pages).

Koyamada et al., "Novel Technique to Improve Spatial Resolution in Brillouin Optical Time-Domain Reflectometry", IEEE Photonics Technology Letters, vol. 19, No. 23, Dec. 1, 2007.

Liehr et al., "Wavelength-Scanning Distributed Acoustic Sensing for Structual Monitoring and Seismic Application", www.mdpi.com/journal/proceedings, Proceedings 2019,15,30.

Pastor-Graells et al.,"Single-shot distributed temperature and strain tracking using direct detection phase-sensitive OTDR with chirped pulses", Optics Express 13121, vol. 24, No. 12, Jun. 13, 2016.

Wang et al.,"Distributed Fiber-Optic Dynamic-Strain Sensor With Sub-Meter Spatial Resolution and Single-Shot Measurement", IEEE Photonic Journal, vol. 11, No. 6, Dec. 2019.

Extended European Search Report issued on Jul. 1, 2025, in corresponding European Patent Application No. 21959902.4. (8 pages).

* cited by examiner

FIG. 1

| | | INDEX | | | | | |
|---|---|---|---|---|---|---|---|
| CONVENTIONAL ART No. | TECHNOLOGY NAME | ABSOLUTE FREQUENCY | PRESENCE/ ABSENCE OF SUFFICIENT STRAIN MEASUREMENT RANGE (*3) | EFFECTIVENESS OF NON-UNIFORM STRAIN DISTRIBUTION | SPEED | SPATIAL RESOLUTION | MEASUREMENT DISTANCE |
| 1 | TW-COTDR | YES BUT INSUFFICIENT | YES | NO | SLOW | GOOD (2cm) | 10km OR MORE |
| 2 | TGD-DISTANCE RIP | NO | NO | NO | 1k/s | ~3m | 10km |
| 3 | CP-ΦOTDR | NO | NO | NO | UNKNOWN | ~5m | 10km |
| 4 | OBR | NO | YES; 500με | YES (*1) | 20/s OR MORE | GOOD (1mm OR LESS) | ~5m |
| 5 | WS-COTDR | NO | NO | NO | UNKNOWN | UNKNOWN | 10km |
| 6 | TGD-DAS | NO | YES; 20με | YES (*2) | MORE THAN 2k/s | ~1m | 10km |

*1: RESOLUTION OF OBR IS SEVERAL TENS OF μm AND NON-UNIFORMITY OF STRAIN DOES NOT BECOME PROBLEM SO MUCH.

*2: IF PHASE CHANGE IS OBTAINED, IT CAN BE DIRECTLY CONVERTED TO STRAIN. HOWEVER, THERE IS SPECIFIC ERROR IN STRAIN VALUE.

*3: EVALUATED WITH YIELD STRAIN VALUE (1200με) OF IRON AS CRITERION OF SUFFICIENT STRAIN RANGE.

FIG. 2

| CONVENTIONAL ART No. | TECHNOLOGY NAME | CHARACTERISTIC FEATURES: FREQUENCY CONTROL | CHIRP TRANSMISSION | RECEPTION MANNER | SIGNAL DECODING METHOD | SHIFT CALCULATION |
|---|---|---|---|---|---|---|
| 1 | TW-COTDR | YES | NO | HOMODYNE | MULTIPLE ADDITION | CORRELATION |
| 2 | TGD-DISTANCE RIP | NO | YES (EXTERNAL MODULATION) | HETERODYNE | SINGLE, MATCHED FILTER | DISTANCE-DIRECTION CORRELATION |
| 3 | CP-ΦOTDR | NO | YES (EXTERNAL MODULATION) | DIRECT RECEPTION | SINGLE, NO DECODING | DISTANCE-DIRECTION CORRELATION |
| 4 | OBR | NO | OFDR | HOMODYNE | SINGLE, SUB-BAND DECODING | FREQUENCY-DIRECTION CORRELATION |
| 5 | WS-COTDR | NO | YES (DIRECT MODULATION) | DIRECT RECEPTION | SINGLE, NO DECODING | FREQUENCY-DIRECTION CORRELATION |
| 6 | TGD-DAS | NO | YES (EXTERNAL MODULATION) | HETERODYNE | SINGLE, MATCHED FILTER | THREE-BAND COMBINATION |

| ITEM | | PARAMETER |
|---|---|---|
| LASER | PULSE WIDTH | 80ns |
| | PULSE SHAPE | RECTANGULAR |
| | CHIRP FREQUENCY BAND PER PULSE | 4GHz |
| | PULSE POWER | 100mW |
| | LINEWIDTH | 300kHz |
| | TOTAL PULSE NUMBER | 16 |
| SAMPLING RATE OF DIGITIZER | | 8Gs/s |
| SUB-BAND | WIDTH | 200MHz |
| | INTERVAL | 25MHz |
| | SPATIAL RESOLUTION | 0.5m |
| FIBER LENGTH | | 50m |

RAYLEIGH INTENSITY PATTERN MEASUREMENT DEVICE AND RAYLEIGH INTENSITY PATTERN MEASUREMENT METHOD

TECHNICAL FIELD

The present disclosure relates to a Rayleigh intensity pattern measurement device and a Rayleigh intensity pattern measurement method.

BACKGROUND ART

A feature of distributed fiber optic sensing (hereinafter, may be referred to as DFOS) technology is that, in practical use, an installed optical fiber can provide an effective measurement value, i.e., has high reliability, under whatever situation the optical fiber is. As representative types of distributed fiber optic sensing technology, there are three types: a Raman type, a Brillouin type, and a Rayleigh type.

In particular, in civil engineering work, the DFOS technology is expected to be applied throughout a range including monitoring of installation quality and maintenance/management after completion of work. However, there have been no actual cases where manufacturing has been made with a life of about 100 years verified.

For example, with DAS in civil engineering work or conventional arts of other companies, dynamic change can be measured with high accuracy, but such technologies are based on an electric signal instead of being based on measurement by an optical fiber, and therefore are low in reproducibility and not suitable in a case of being used for a long-term management target.

On the other hand, types using an optical fiber have reproducibility and thus are considered more suitable for a long-term management target. Among such types, representative types of the DFOS technology include the above three types, and among these, the Brillouin type and the Rayleigh type are particularly advantageous. However, in the Brillouin type, measurement can be performed with an absolute frequency but accuracy thereof is often insufficient as compared to required accuracy, and at present, the Rayleigh type is assumed to be most effective.

The Rayleigh type has recently had many features such as high stability, a high signal intensity, capability of usage in both of a multimode and a single mode, high accuracy, and high resolution of not greater than 1 mm, and therefore has attracted attention. That is, as compared to the other two types described above, the Rayleigh type has three excellent features of (1) being high in measurement stability and signal intensity and capable of usage in both of a single mode and a multimode, (2) being higher in measurement accuracy than the other two types, and (3) having high resolution of not greater than 1 mm.

Thus, general explanation has been made as described above. Next, for comparing conventional arts regarding the DFOS in detail, description will be given below with reference to specific examples shown in FIG. 1.

Here, FIG. 1 is a list table in which representative performances of each of six conventional arts written in the left column are shown about six indices written in the upper row (see Patent Document 1 and Non-Patent Documents 1-5).

In FIG. 1, the above six indices shown in the upper row are, from the left side, presence/absence of an absolute frequency (which means the frequency of an LD where the frequency can be controlled and error of the frequency is clear; the same applies below), presence/absence of a sufficient measurement range (whether the measurement range is sufficient), effectiveness of a non-uniform strain distribution (whether there is no problem in measurement even if there is a non-uniform strain distribution, in other words, a problem of correlation failure is considered absent in a comparatively small strain range), speed (i.e., measurement speed), spatial resolution, and measurement distance (maximum measurable distance). Here, the measurement range is a strain measurement range published in a paper or as a value about a product.

As a specific numerical example, in FIG. 1, a tunable-wavelength coherent optical time domain reflectometry (TW-COTDR) technology shown at conventional art No. 1 is capable of controlling the absolute frequency with measurement accuracy of 2.3 MHz, but is a case-by-case type depending on a component and does not have a criterion to be successively used for a next device type. In an OBR/Luna technology shown in the fourth row, regarding effectiveness of a non-uniform strain distribution, resolution of several tens of μm is achieved and non-uniformity of strain does not become a problem under this value, so that effectiveness is "YES". Also in a TGD-DAS technology shown in the sixth row, if phase change is targeted, this can be directly converted to strain and therefore effectiveness is "YES".

From FIG. 1, it is found that the six conventional arts shown in the table do not include the one that has a measurement distance of not less than 10 km, has a spatial resolution performance not lower than a standard level, and satisfies all of the absolute frequency, a sufficient measurement range, and effectiveness of a non-uniform strain distribution.

FIG. 2 shows a table for the above six conventional arts regarding DFOS in which characteristic technologies used in the six conventional arts are classified into five kinds and compared (see Patent Document 1 and Non-Patent Documents 1-5). In FIG. 2, for frequency control among the above five kinds of characteristic technologies, whether or not there is frequency control means (e.g., Etalon or Gas Cell) is indicated.

Meanwhile, as an actual need in the DFOS technologies, a life of 100 years is required for a bridge, an oil well, and the like which are monitoring targets. In addition, in measurement for earthquakes and the like, a change amount over 100 years needs to be assuredly acquired.

Accordingly, with respect to the above severe requirements, whether or not a Rayleigh backscattering spectrum (hereinafter, may be abbreviated as RBS) method which corresponds to the aforementioned Rayleigh type can be applied, will be considered below. In a case of applying the Rayleigh backscattering spectrum (RBS) method to measurement for a management target, this method has three features described below and therefore is expected to be able to satisfy the above requirements.

That is, the three features are that an optical fiber can be used as material coordinates (coordinates defined in a moving body) and thus can be recognized as indicating a position (indicating a location), that detection can be performed even with means other than an optical signal, and that the method can be used with no practical limitation in distance resolution and measurement accuracy.

The Rayleigh backscattering spectrum (RBS) method applied to measurement for a management target is substantially the same as using a Rayleigh intensity pattern (hereinafter, may be referred to as RIP) in which a position and a frequency are used as variables and the intensity of an electric field, the absolute value thereof, or the square of the absolute value is used as a function value. Therefore, in the present disclosure, such a device is referred to as a Rayleigh intensity pattern measurement device, to give description below.

In a case of applying the RIP as means for measuring a management target, with a spatial position matched, a cross-correlation between an RIP value at time t1 and an RIP value at time t2 is calculated and a Rayleigh frequency shift amount is calculated from a correlation peak position. That is, Rayleigh frequency shift is measured by a power correlation.

Here, measurement technology by the RIP will be described in more detail with reference to FIG. 3. FIG. 3 shows an example of an RIP distribution obtained by the Rayleigh backscattering spectrum method using a full-band tunable-wavelength distributed feedback LD (LD: Laser Diode).

Here, as a measurement quantity for the RIP, a Rayleigh frequency shift amount $\Delta\nu_R$ represented by Expression ($F_s$) is calculated (see, for example, Patent Document 2).

$$\Delta\nu_R = C_{21}\Delta\varepsilon + C_{22}\Delta T + C_{23}\Delta P \qquad (F_s)$$

In Expression ($F_s$), $C_{21}$, $C_{22}$, and $C_{23}$ are sensitivity coefficients given for the Rayleigh frequency shift, and $\Delta\varepsilon$, $\Delta T$, and $\Delta P$ are strain, temperature change, and pressure change of an optical fiber at a measurement position, respectively.

The frequency shift derived from strain change, temperature change, and pressure change described above is obtained through high correlation analysis (therefore, the frequency shift is a relative value). A signal used in correlation analysis is a power spectrum in a specific distance range. There is no influence by phase.

Accordingly, the frequency shift is considered to be clear feature comparison of a frequency in the TW-COTDR method between two states (reference time and measurement time) at the same location. Here, with decoding from the TW-COTDR method and a pulse pre-pump Brillouin optical time domain analysis (PPP-BOTDA) method which is a high-accuracy Brillouin technology, requirements of a hybrid measurement method using two methods of a Rayleigh backscatter light method and a Brillouin backscatter light method can be coordinated.

Meanwhile, the Rayleigh backscatter light method in a time domain has the following advantages as compared to the Brillouin backscatter light method. That is, the advantages are that only a single-end method is required, that slight change in a case such as creep monitoring over a long distance can be accurately and easily detected, and that a signal from an optical fiber independent of a phase is used and therefore stability and high reproducibility are obtained.

CITATION LIST

Patent Document

Patent Document 1: Specification of U.S. Pat. No. 7,440,087
Patent Document 2: WO2014/083989
Patent Document 3: Japanese Patent No. 6552983

Non-Patent Document

Non-Patent Document 1: Y. Koyamada, "Novel Technique to Improve Spatial Resolution in Brillouin Optical Time-Domain Reflectometry", IEEE PHOTONICS TECHNOLOGY LETTERS, VOL. 19, NO. 23, Dec. 1, 2007
Non-Patent Document 2: Y. Wang et al., "Distributed Fiber-Optic Dynamic-Strain Sensor With Sub-Meter Spatial Resolution and Single-Shot Measurement", IEEE Photonic Journal, Vol. 11, No. 6, December, 2019
Non-Patent Document 3: J. Pastor-Graells, et al., "Single-shot distributed temperature and strain tracking using direct detection phase-sensitive OTDR with chirped pulses", OPTICS EXPRESS 13121, Vol. 24, No. 12, Jun. 13, 2016
Non-Patent Document 4: S. Liehr, et al., "Wavelength-Scanning Distributed Acoustic Sensing for Structural Monitoring and Seismic Application", www.mdpi.com/journal/proceedings, Proceedings 2019, 15, 30
Non-Patent Document 5: D. Chen, et al., "Fiber-optic distributed acoustic sensor based on a chirped pulse and a non-matched filter", OPTICS EXPRESS 29415, Vol. 27, No. 20, Sep. 30, 2019

SUMMARY OF THE INVENTION

Problem to be Solved by the Invention

However, the conventional art involving the TW-COTDR method has the following problems.

First, the "absolute frequency (frequency as absolute reference)" which is the first index shown in FIG. 1 has not been established. Also, the conventional arts shown at conventional art No. 2 to conventional art No. 6 cannot control the value of the LD frequency or wavelength to clarify error, as shown in FIG. 1. In the TW-COTDR technology shown at conventional art No. 1, the wavelength (beam frequency) of the LD is controlled but the absolute value is not managed. Therefore, in measurement between different devices (of the same manufacturer) or between devices of different manufacturers, only relative values of frequency shifts can be obtained.

Next, the "measurement range" which is the second index is not sufficient (a practically sufficient measurement range has not been ensured). In each art other than conventional art No. 1, the measurement range is extremely small. Specifically, for example, temperature change by 100° C. is a common event, but each method using a chirp pulse technology (each conventional art other than the TW-COTDR method of conventional art No. 1) can perform measurement only in a range less than four digits of a required numerical value.

Next, "effectiveness of a non-uniform strain distribution" which is the third index is lacking. In the TW-COTDR method of conventional art No. 1, if a non-uniform strain distribution occurs within a range of spatial resolution, i.e., within half the pulse width, strain cannot be detected appropriately. This is because a correlation with reference data is lost due to strain of a Rayleigh intensity pattern (RIP) caused by a non-uniform strain distribution within a length range of spatial resolution.

In addition, during monitoring over a long term, once a correlation fails to be obtained, relevance to the initial value is lost, so that long-term monitoring can no longer be performed. This is because, in the Rayleigh backscatter light method, in principle, data are accumulated in the time-axis direction to finally measure deformation.

An actual measurement example in which a correlation fails to be obtained will be described with reference to FIGS. 4A and 4B. FIG. 4A shows a measurement result in a case of measuring frequency shift of Rayleigh backscatter light (hereinafter, may be referred to as RFS) using a bar member with the following measurement parameters.

Measurement parameters: sweep start frequency=192010 GHz, sweep period=400 GHz, sweep step=0.2 GHz, spatial resolution=2 cm, and sampling interval=1 cm.

In FIG. 4A, in an area enclosed by a dotted-line oval (in a distance position range from 512.3 m to 513.1 m on the horizontal axis), strain has not been detected properly. Specifically, for example, at a distance position 512.5 m, a correlation coefficient between two data, i.e., reference data and actual measured data, is equal to or smaller than 0.2 as shown in FIG. 4B, thus indicating that there is no correlation.

Conventionally, in the Rayleigh backscatter light method, data are accumulated in the time direction to finally calculate deformation. Therefore, in a case where one piece of data is not successfully accumulated during data accumulation, a correlation with the initial value (initial strain change amount) is lost in the subsequent measurement.

In order to consider the above RFS data, comparison with measurement data of a bar member measured by a method based on Brillouin scattering light, which is a measurement method not using a correlation between two data, will be described. FIG. 5 shows data of a measurement result in a case where the same bar member as described above was used and strain that occurred in the bar member is measured on the basis of Brillouin scattering light with the following measurement parameters.

Measurement parameters: sweep start frequency=10 GHz, sweep period=1.45 GHz, sweep step=5 MHz, spatial resolution=5 cm, and sampling interval=2.5 cm.

FIG. 5 shows a strain distribution with the horizontal axis indicating a distance (unit: m), regarding strain data of the bar member measured using the Brillouin backscatter light method. From FIG. 5, it is found that a strain value of not less than 100με at a distance of about 512.2 m changes to −400με at a distance of about 512.5 m and thus, as a difference, strain change of not less than 500με has been measured.

When strain change around a distance of 512.2 m is checked in FIG. 5, it is found that strain change of 159.84με has occurred with respect to distance change of 4.1 cm, as shown in the graph. In other words, in a region of 4.1 cm around a distance of 512.5 m (4 cm corresponds to a pulse length used in the Rayleigh backscatter light method), a strain change amount per 1 m was 3898.54με.

As described above, it has been found that, in a case where there is sharp strain change (there is non-uniform strain) within a range of spatial resolution, when strain change of the same bar member is measured by the Rayleigh backscatter light method, accurate strain change or a cross-correlation can no longer be measured.

Normally, the correlation is improved through interpolation of data. However, the correlation was not improved in the above case. Here, a unit step of frequency (change) in data processing is 0.04 GHz.

Next, the fourth problem is that, in the conventional arts using homodyne reception as a reception method (the first and fourth arts in the table; see FIG. 2), phase information needed for advanced signal analysis is lost from the beginning in the existing homodyne reception.

Further, the fifth problem is that, in a case where the speed indicated as an index in the table is slow, it is impossible to follow up a high-speed phenomenon and in addition, if there is strain change in measurement, different frequency shifts ($\Delta\nu_R$) are included in a result of frequency shift of Rayleigh backscatter light, so that a correlation is not obtained as described above. Thus, effectiveness of monitoring will eventually end up being lost as a whole.

Next, technical problems in implementing each conventional art shown in FIG. 1 will be described. In the TW-COTDR (conventional art No. 1), there is a problem that, since a full-band LD is used, the measurement range is sufficiently wide but the linewidth of the LD is extremely great. For example, in a case of 4 MHz, an effective coherence length is only several tens of m, and great phase noise is included in a phase signal in a time gated digital (TGD) method for phase analysis. Therefore, the TW-COTDR cannot be used as it is. That is, in the TW-COTDR method, homodyne reception is used as a reception method as shown in FIG. 2, and therefore phase information might be lost from the beginning and phase information needed for advanced signal analysis cannot be used.

The measurement using the TGD-DAS method (method shown at conventional art No. 6 in FIG. 1) has successfully been performed using a light source having a linewidth of not greater than 1 KHz, but in this case, there is a problem that change of the frequency is almost impossible (because there are almost no commercial products).

Further, in order to ensure a wide measurement range, the range of the reception frequency (reception bandwidth) for the RIP needs to be not less than 100 GHz, and it is nearly impossible to cover such a range as a reception bandwidth of an electric signal at present.

The problems described above are summarized below, using specific numerical examples for each of representative conventional arts. The TW-COTDR method of conventional art No. 1 has a feature of being excellent in static measurement for strain, temperature, or the like and being capable of measurement with high spatial resolution (2 cm) and high accuracy, but has a disadvantage that the measurement speed is slow so that measurement takes several tens of seconds. On the other hand, the TGD-DAS method of conventional art No. 6 has a feature of being excellent in dynamic measurement such as sound wave measurement and having a high measurement speed of not less than 2000 times per second, but the spatial resolution is as low as about 1 m. In addition, although not shown in FIG. 1, this method is limited to measurement for minute change (e.g., temperature change is up to 0.2° C.) and thus is not suitable for measurement for large change.

The present disclosure has been made to solve the above problems, and an object of the present disclosure is to provide a Rayleigh intensity pattern measurement device that can satisfy, at the same time, three parameters, i.e., spatial resolution, measurement speed, and sufficient measurement range, which are in a trade-off relationship for achieving high-speed and high-accuracy measurement, and enables management of acquired data over a long term.

Means to Solve the Problem

A Rayleigh intensity pattern measurement device according to the present disclosure includes: a light source unit including a tunable-wavelength LD and a controller capable of changing a frequency of a laser beam emitted from the tunable-wavelength LD; an optical coupler which causes the laser beam emitted from the light source unit to enter into an optical fiber and causes Rayleigh scattering light from the optical fiber to go out through a path different from an entry path of the laser beam; a reception unit which coherently receives local light from the light source unit and the Rayleigh scattering light from the optical coupler; and a Rayleigh intensity pattern digital processing unit including an A/D converter which performs A/D conversion of a signal outputted from the reception unit, a first calculation unit which performs, by a predetermined method, calculation on the signal converted by the A/D converter, a memory-database which receives and stores the signal calculated by the first calculation unit, and a second calculation unit which performs predetermined calculation on the basis of data stored in the memory-database, the Rayleigh intensity pattern digital processing unit being configured to, from two different Rayleigh intensity patterns at a predetermined measurement position obtained from an electric field signal of the Rayleigh scattering light, calculate a cross-correlation coefficient after performing predetermined correction for the measurement position by the second calculation unit, and store, in the memory-database, the cross-correlation coefficient in a case where the calculated cross-correlation coefficient has become equal to or greater than a predetermined threshold. A strain distribution or a temperature distribution of a measurement target is determined by calculating Rayleigh frequency shift on the basis of the cross-correlation coefficient that has become equal to or greater than the predetermined threshold.

Effect of the Invention

The Rayleigh intensity pattern measurement device according to the present disclosure makes it possible to provide a Rayleigh intensity pattern measurement device that can satisfy, at the same time, three parameters, i.e., spatial resolution, measurement speed, and sufficient measurement range, which are in a trade-off relationship for achieving high-speed and high-accuracy measurement, and enables management of acquired data over a long term.

BRIEF DESCRIPTION OF THE DRAWINGS

FIG. 1 illustrates technical indices as problems to be solved by a Rayleigh intensity pattern measurement device of embodiment 1.

FIG. 2 illustrates characteristic technologies of DFOS.

DESCRIPTION OF EMBODIMENTS

Embodiment 1

Hereinafter, the entire configuration of a Rayleigh intensity pattern measurement device (hereinafter, may be abbreviated as RIP measurement device) according to embodiment 1 will be described with reference to FIG. 6 and FIG. 7.

Figure 6:
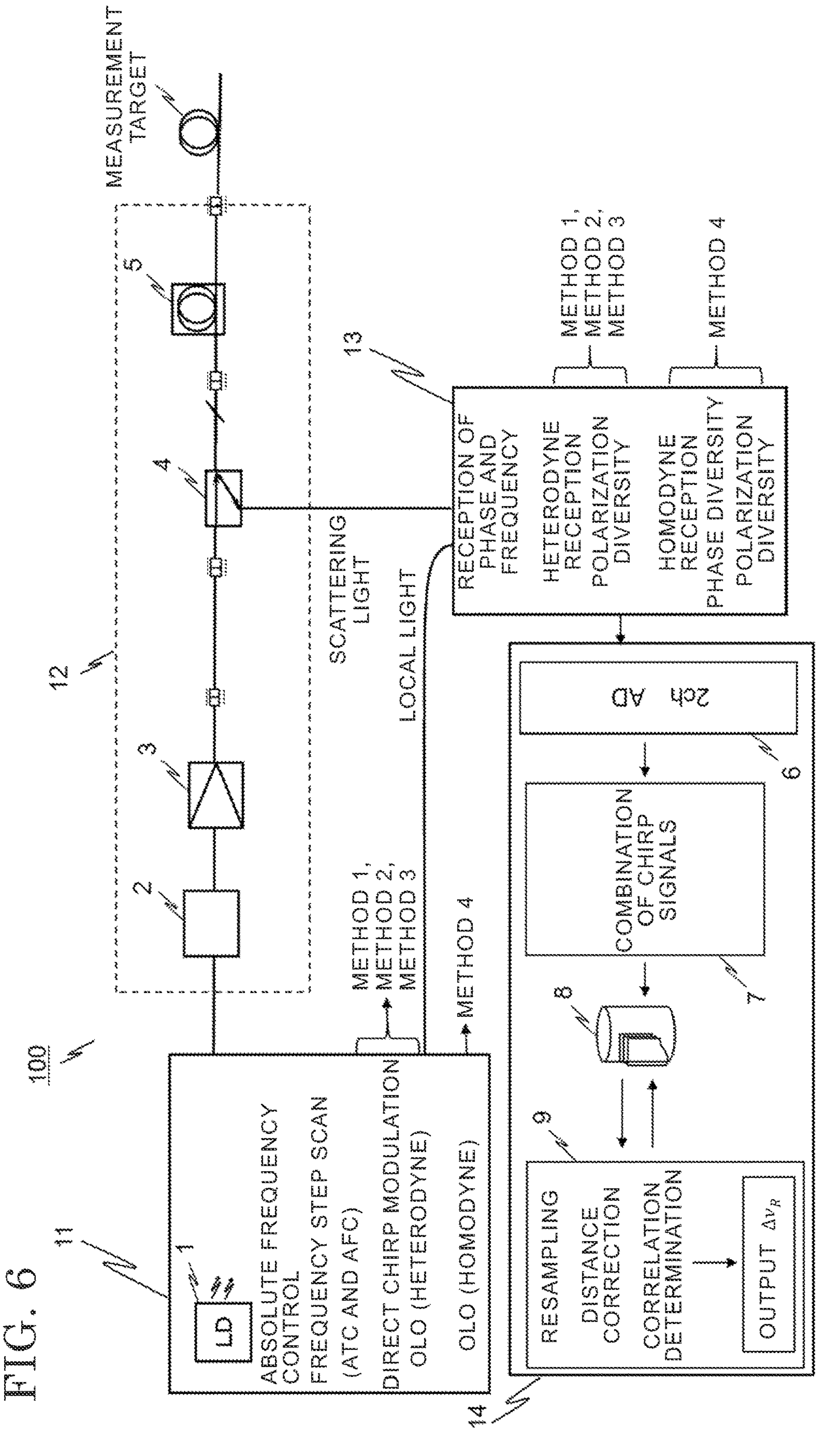
FIG. 6 illustrates the entire configuration of the RIP measurement device according to the present embodiment 1.

FIG. 6 illustrates the entire configuration of an RIP measurement device 100 according to the present embodiment 1. The RIP measurement device 100 according to embodiment 1 is a measurement device of a TW (tunable-wavelength) TGD-RFS (Rayleigh frequency shift) type which uses chirp pulses in a divided manner.

The RIP measurement device 100 according to the present embodiment 1 includes roughly four major components. These components are a light source unit 11, a transmission/reception optical unit 12, a reception unit 13, and an RIP determination digital processing unit 14 (hereinafter, may be referred to as Rayleigh intensity pattern digital processing unit 14 or RIP digital processing unit 14). Hereinafter, the details of these units will be described in order.

The light source unit 11 includes an LD 1 which is a wide-bandwidth tunable-wavelength laser (TW-LD) and a controller for controlling a laser beam to be emitted from the LD 1. While performing automatic temperature control and automatic frequency control, the light source unit 11 performs, by an included optical local oscillator (OLO), absolute frequency control for the LD 1 (here, the absolute frequency control uses, as a reference, an absorption wavelength of a molecule as in a Gas Cell, for example; information therefor is known and the absolute frequency control is less dependent on temperature and can be easily implemented within such a range that does not influence measurement accuracy) and frequency step control, to oscillate and output divided chirp pulses. As the tunable-wavelength laser, an external modulation type is also included.

That is, using chirp optical pulses, the light source unit 11 controls the frequency of the tunable-wavelength LD 1 and performs sweep while changing the frequency stepwise at a plurality of steps (e.g., changing at 12 steps over 200 GHz). In this case, using the above-described TW-LD, high-accuracy optical pulses are generated by a time gated digital (TGD) method or the like. The sweep width in the TGD method is, for example, 4 GHz (sampling rate is 8 GS/s).

The transmission/reception optical unit 12 includes an optical switch 2 for making a laser signal into a pulse, an erbium-doped fiber amplifier 3 (hereinafter, abbreviated as EDFA 3) for amplifying an output signal from the optical switch 2, and an optical coupler 4 which transmits a signal from the EDFA 3 to a measurement target body (hereinafter, may be referred to as measurement target (specifically, optical fiber)) via a reference optical fiber 5 and which receives backscatter light which is scattering light from the measurement target body based on the transmitted signal, via the reference optical fiber 5, and then transmits the backscatter light to an external receiver described later.

The reception unit 13 includes a receiver which receives backscatter light transmitted from the optical coupler 4 of the transmission/reception optical unit 12 and receives source light from the light source unit 11. The receiver is configured by a heterodyne receiver which performs reception in a polarization diversity manner or a homodyne receiver which performs reception in a phase diversity manner and a polarization diversity manner, at the time of reception, in order to improve reception sensitivity and acquire phase information.

The RIP digital processing unit 14 is a part where the intensity or the phase of a signal is analyzed in a digital manner. Here, an output signal from the reception unit 13 is received by being converted to a digital signal by a 2ch A/D converter 6 at high speed, and the digital signal is processed at high speed by four kinds of methods described later, using a field programmable gate array (FPGA), an application specific integrated circuit (ASIC), or the like. The RIP digital processing unit 14 includes a processor for performing calculation processing on a digital signal, a memory-database 8 (hereinafter, may be referred to as memory-DB 8) for storing and saving the signal processed by the processor, a first calculation unit 7 which performs calculation on a signal received from the 2ch A/D converter 6 (e.g., performs calculation for combining a plurality of chirp signals) and outputs the resultant signal which is different from the received signal, to the memory-database 8, and a second calculation unit 9 which selects data for two times (e.g., time $t_i$ and time $t_j$) to be subjected to correlation analysis from information stored in the memory-DB 8, calculates initial Rayleigh frequency shift $\Delta v_R$_I on the basis of the two different data, performs resampling such as interpolation processing on the frequency axis, distance correction, and calculation processing such as correlation (correlation determination), and outputs definite Rayleigh frequency shift $\Delta v_{R\text{-}D}$ (the second calculation unit 9 will be described in detail later with reference to FIG. 7 and the like; hereinafter, the second calculation unit 9 may be simply referred to as calculation unit 9).

Here, the 2ch A/D converter 6 can, for example, convert an amplitude component and a phase component of a signal to respective channels by a processing device such as an FPGA chip, for example. In addition, the RIP digital processing unit 14 can analyze the intensity and the phase of a signal in a digital manner. In FIG. 6, output of the definite Rayleigh frequency shift $\Delta v_{R\text{-}D}$ is included inside the RIP digital processing unit 14. However, the output may be outside the RIP digital processing unit 14.

Among the above four major components, the three components enclosed by solid-line frames, i.e., the light source unit 11, the reception unit 13, and the RIP digital processing unit 14, are particularly characteristic components of the RIP measurement device according to the present embodiment 1. On the other hand, the transmission/reception optical unit 12 enclosed by a dotted-line frame can be configured by the existing OTDR technology and is not particularly novel (see, for example, Patent Document 3).

In FIG. 6, a method 1, a method 2, a method 3, and a method 4 are assigned with respective numbers for clearly explaining differences in operations of the RIP digital processing unit 14 in accordance with reception methods in the reception unit 13. These methods will be described in detail below with reference to FIG. 7.

Hereinafter, while particularly focusing on the second calculation unit 9, the entire operation of the RIP measurement device according to the present embodiment 1 will be described in detail for each of the method 1, the method 2, the method 3, and the method 4, with reference to FIG. 7. Whichever method is used, improvement in reception sensitivity for a signal and high-density wavelength multiplexing can be achieved.

First, in the method 1, a chirp signal which is a signal heterodyne-received by the reception unit 13 is not subjected to any special processing in the 2ch A/D converter 6 (the signal is passed through) and is directly stored into the memory-DB 8 of the RIP digital processing unit 14 (step S1). In the memory-DB 8, data are stored in time series $t_k$. From these data, data for two times, e.g., time $t_i$ and time $t_j$, are selected (step S4). On the basis of the selected data for the two times, the second calculation unit 9 executes a series of operations below.

First, the initial Rayleigh frequency shift $\Delta\nu_{R-I}$ is obtained through calculation (step S5). Next, on the calculated initial Rayleigh frequency shift $\Delta\nu_{R-I}$, frequency resampling processing including interpolation processing is performed for distance correction (step S6). Next, on the basis of the frequency-resampled data, a cross-correlation coefficient after distance correction is calculated (step S7). Next, whether or not the calculated value of the cross-correlation coefficient is greater than a predetermined threshold is determined (step S8). The threshold can be experientially set at 0.3, for example.

If the result of the above determination is "Yes", the Rayleigh frequency shift $\Delta\nu_R$ is calculated on the basis of the calculated value of the cross-correlation coefficient, and the calculated value of the Rayleigh frequency shift $\Delta\nu_R$ is determined as the definite Rayleigh frequency shift $\Delta\nu_{R-D}$ (step S10).

On the other hand, if a result of the above determination is "No", analysis for detection adjustment for non-uniform strain is performed. That is, data serving as a base for recalculating the cross-correlation coefficient after distance correction is calculated through analysis (step S9), and the cross-correlation coefficient after distance correction is calculated again (step S7). Next, whether or not the calculated value of the cross-correlation coefficient is greater than the predetermined threshold is determined (step S8).

Thus, until the value of the cross-correlation coefficient becomes greater than the predetermined threshold, operations of step S9, step S7, and then step S8 are repeated. Then, on the basis of the value of the cross-correlation coefficient in a case where the value of the cross-correlation coefficient is greater than the predetermined threshold, the Rayleigh frequency shift $\Delta\nu_R$ is calculated, and the calculated value of the Rayleigh frequency shift $\Delta\nu_R$ is determined as the definite Rayleigh frequency shift $\Delta\nu_{R-D}$ (step S10).

In the method 1, since processing by the 2ch A/D converter 6 is not performed, high-speed processing for data can be performed.

Next, the method 2 will be described focusing on difference from the method 1. In the method 2, a chirp signal which is a signal heterodyne-received by the reception unit 13 is subjected to A/D conversion by the 2ch A/D converter 6 and then subjected to comb filtering processing by an FPGA or the like, and the resultant signal is stored into the memory-DB 8 of the RIP digital processing unit 14 (step S2). The subsequent process is the same as in the method 1, and therefore the detailed description thereof is omitted here.

In the method 2, by performing comb filtering processing, periodic noise contained in a signal can be removed, whereby measured data can be made highly accurate.

Next, the method 3 will be described focusing on difference from the method 1 and the method 2. In the method 3, after the process in the method 2, the processed signal is subjected to digital processing so as to be squared and the resultant signal is stored into the memory-DB 8 of the RIP digital processing unit 14 (step S3). The subsequent process is the same as in the method 1, and therefore the detailed description thereof is omitted here.

In the method 3, since the squared signal is used, a phase among signal components has a reduced influence, so that measured data can be made highly accurate.

Finally, the method 4 will be described focusing on difference from the method 1, the method 2, and the method 3. In the methods 1 to 3, a chirp signal which is a signal heterodyne-received by the reception unit 13 is used, whereas in the method 4, a signal homodyne-received by the reception unit 13, which contains phase information, is used unlike the above three methods. In addition, a phase diversity manner is adopted so as not to lose phase information. The signal obtained by squaring the homodyne-received signal is stored into the memory-DB 8 of the RIP digital processing unit 14 (step S3). The subsequent operation is the same as in the method 1, and therefore the detailed description thereof is omitted here.

As compared to a case of using a heterodyne-received signal as in the methods 1 to 3, the method 4 requires a narrow-linewidth LD having less phase noise, and optical PLL, but has an advantage that it becomes possible to perform reception with highest sensitivity and it becomes easier to perform data processing at high speed.

With the Rayleigh intensity pattern measurement device 100 according to embodiment 1 configured as described above, pulse power can be effectively improved, and in addition, scattering waveforms at a plurality of frequencies can be acquired at the same time and thus the number of transmitted optical pulses can be significantly decreased, whereby a measurement period can be shortened. In order to analyze the correlation of the RIP, a large amount of analysis is performed in the RIP digital processing unit 14.

Figure 7:
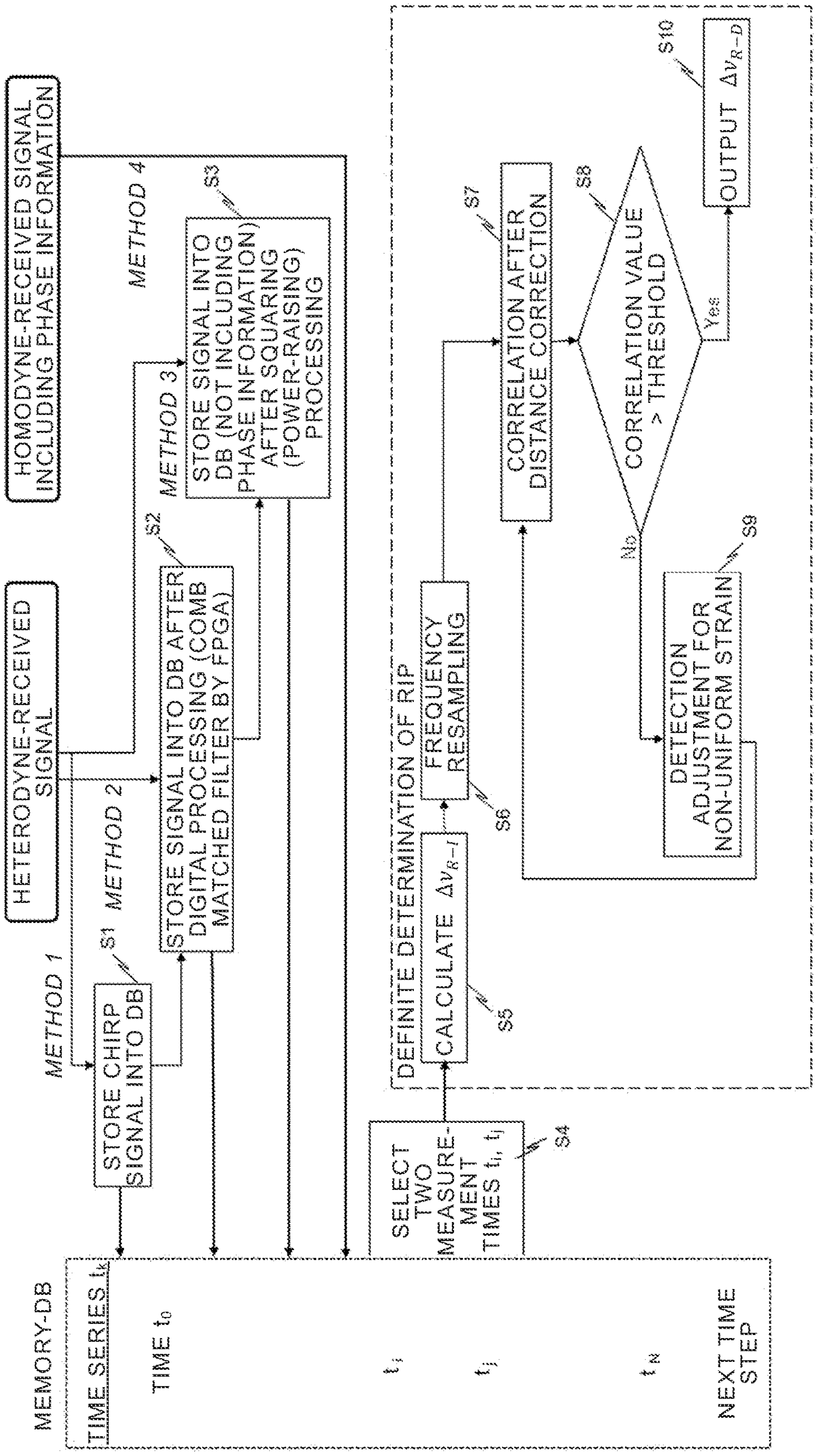
FIG. 7 illustrates operation of the RIP measurement device according to the present embodiment 1.

The above methods 1 to 4 are configured such that it becomes possible to perform detection for non-uniform strain appropriately by using the analysis method for detection adjustment as shown in FIG. 7. Next, the analysis method for enabling appropriate detection for non-uniform strain, used in common among the methods 1 to 4, will be described in detail below. The analysis method is roughly classified into two kinds, i.e., an analysis method N1 and an analysis method N2. Hereinafter, these methods will be described in order from the analysis method N1.

[Analysis Method N1]

In the analysis method N1, even in a case where there is non-uniform strain, a strain distribution in a measurement target can be appropriately detected from a cross-correlation between an observation spectrum obtained from an electric field of observation data, and a reference spectrum obtained from an electric field of reference data of Rayleigh scattering light and various reference spectra obtained by deforming the above reference spectrum. Deformation of the reference spectrum is performed for coping with the slope of strain (which will be described in detail later) and the deformation differs depending on the magnitude of the slope. Hereinafter, a processing method (algorithm) used in the analysis method N1 will be described in detail.

For creating the above algorithm, first, parameters are determined by a model as a basis. Here, it is assumed that a laser beam with a frequency ν and a pulse width D enters from the input end of an optical fiber, and light coming back while scattering, in particular, Rayleigh scattering light P, is observed.

In this case, an observation value to be obtained is the intensity of light obtained through direct detection or the intensity of an electric field obtained through heterodyne reception, and each value is represented as P=P(t, ν) using two parameters which are time t and a frequency ν. For example, by acquiring observation values while scanning the frequency ν of the laser light source, spectrum data of Rayleigh scattering light is obtained.

Next, it is assumed that the temperature or strain in the optical fiber has changed. In this case, the optical path length changes. That is, a round-trip period τ(z) of light over a distance z from the input end of the optical fiber changes. The observation value in this case can be represented as P=P(τ(z), ν) by replacing the time t with the round-trip period τ(z) of light. Notation of P(τ(z), ν) is simplified so that hereinafter, P(τ(z), ν) is written as P(z, ν).

Then, in the following description, in order to consider spectra before and after change in strain or temperature first, a spectrum before change in strain or temperature is denoted by $P_0(z, \nu)$ and a spectrum after change is denoted by $P_1(z, \nu)$.

Here, change in strain or temperature is assumed to be constant in a distance region $[z-l_p/2, z+l_p/2]$(hereinafter, the distance region is simply referred to as region), and the Rayleigh frequency shift is denoted by $\nu_R(z)$. In this case, the Rayleigh frequency shift $\nu_R(z)$ has a constant value in the above region.

Then, it is known that the following relational expression is satisfied between a spectrum $P_1(z, \nu)$ after change and a spectrum $P_0(z, \nu)$ before change.

[Mathematical 1]

$$P_1(z, \nu) = P_0(z, \nu - \nu_R(z)) \tag{1}$$

That is, the spectrum after change is represented using frequency shift of the spectrum before change.

[Case where Change in Strain or Temperature is not Constant in Pulse]

Next, a case where change in strain or temperature is not constant in a pulse as in the problem is assumed. In this case, the relationship between spectrums cannot be represented by the frequency shift in the above Expression (1), so that detection performance is deteriorated. This will be considered in detail below.

[Case where Change in Strain or Temperature is not Constant in Pulse]

For convenience of calculation, the frequency variable is changed from the frequency ν on the time axis described above to a corresponding spatial frequency (see Expression (2)). In addition, the Rayleigh frequency shift is represented by the following Expression (3).

[Mathematical 2]

$$u = 2\nu/v_g[\text{cycle}/m] \tag{2}$$

-continued

[Mathematical 3]

$$u_R(z) = 2\nu_R(z)/v_g \tag{3}$$

Here, observed electric fields of scattering light before and after change are respectively denoted by $Y_0(z, u)$, $Y_1(z, u)$. Then, the squares of the absolute values of $Y_0(z, u)$ and $Y_1(z, u)$ give spectrums (see Expression (4) and Expression (5)).

[Mathematical 4]

$$P_0(z, u) = |Y_0(z, u)|^2 \tag{4}$$

[Mathematical 5]

$$P_1(z, u) = |Y_1(z, u)|^2 \tag{5}$$

Here, $Y_0(z, u)$ and $Y_1(z, u)$ are represented by Expression (6) and Expression (7), respectively.

[Mathematical 6]

$$Y_0(z, u) = \int_{-l_p/2}^{l_p/2} \rho(z+\zeta)e^{-2\pi iu\zeta}d\zeta \tag{6}$$

[Mathematical 7]

$$Y_1(z, u) = \int_{-l_p/2}^{l_p/2} \rho(z+\zeta)\exp\left\{-2\pi i\left[u\zeta - \int_0^{\zeta} u_R(z+\zeta')d\zeta'\right]\right\}d\zeta \tag{7}$$

In order to use electric field data, heterodyne detection needs to be used.

It is assumed that, in a region corresponding to the pulse width, change in strain or temperature occurs linearly, and the Rayleigh frequency shift is assumed to be represented by the following Expression (8) in the region $[z-l_p/2, z+l_p/2]$.

[Mathematical 8]

$$\nu_R(z+\zeta) = a + b\zeta,\ -l_p/2 \leqq \zeta \leqq l_p/2 \tag{8}$$

Here, a is Rayleigh frequency shift at the center of the region, and b is the slope of Rayleigh frequency shift in the region. Here, the parameters a, b are changed to parameter representations α, β by a spatial frequency as shown below. That is, where α is $2a/v_g$ and β is $2b/v_g$, the Rayleigh frequency is represented by Expression (9) using a and β.

[Mathematical 9]

$$u_R(z+\zeta) = \alpha + \beta\zeta,\ -l_p/2 \leqq \zeta \leqq l_p/2 \tag{9}$$

Here, using Expression (9), the following Expression (10) is obtained from Expression (7).

[Mathematical 10]

$$Y_1(z, u+\alpha) = \int_{-l_p/2}^{l_p/2} \rho(z+\zeta)e^{\pi i\beta\zeta^2}e^{-2\pi iu\zeta}d\zeta \tag{10}$$

The right-hand side of Expression (10) is Fourier transform of a product of two functions $\rho(z+\zeta)$ $(-l_p/2\leq\zeta\leq l_p/2)$ and $\exp(\pi i\beta\zeta^2)$ $(-\infty<\zeta<\infty)$ with respect to $\zeta$. Here, $\rho(z)$ is a Rayleigh backscatter coefficient at the distance z, and Fourier transform of the product of the two functions is equal to convolution of Fourier transforms of the respective functions. In addition, Fourier transform of $\rho(z+\zeta)$ $(-l_p/2\leq\zeta\leq l_p/2)$ is equal to $Y_0(z, u)$, as shown in Expression (6) Thus, the following Expression (11) is obtained, with a constant coefficient excluded.

[Mathematical 11]

$$Y_1(z, u+\alpha) = q(u: \beta) * Y_0(z, u) \tag{11}$$

Here, * on the right-hand side represents convolution with respect to u.

In addition, $q(u; \beta)$ is Fourier transform of a chirp $\exp(\pi i\beta\zeta^2)$ on the spatial axis, and is represented by Expression (12).

[Mathematical 12]

$$q(u; \beta) = \int_{-\infty}^{\infty} e^{\pi i\beta\zeta^2} e^{-2\pi iu\zeta} d\zeta = \begin{cases} \frac{1+i}{\sqrt{2|\beta|}} e^{-\pi iu^2/\beta}, & \beta > 0 \\ \delta(u), & \beta = 0 \\ \frac{1-i}{\sqrt{2|\beta|}} e^{-\pi iu^2/\beta}, & \beta < 0 \end{cases} \tag{12}$$

This is a chirp on the frequency axis.

Therefore, the spectrum after change can be represented by Expression (13), but cannot be represented using the original spectrum, unlike the case where $u_R$ is constant in the region.

[Mathematical 13]

$$P_1(z, u+\alpha) = |q(u: \beta) * Y_0(z, u)|^2 \tag{13}$$

In Expression (4), Expression (5), Expression (6), and Expression (10), for simplification, $\alpha$ is set at 0, z is arbitrarily fixed to one value, and a notation of z which is an argument is omitted, whereby spectra of scattering light are represented by simple representation as shown in Expression (14) and Expression (15).

[Mathematical 14]

$$P_0(u) = |Y_0(u)|^2 \tag{14}$$

[Mathematical 15]

$$P_1(u) = |Y_1(u)|^2 \tag{15}$$

Here, the Rayleigh backscatter coefficient $\rho(z)$ can be spatially regarded as a white Gaussian process, and therefore, using a Dirac $\delta$ function, the following Expression (16) is obtained. Here, E[·] represents an expected value. In addition, Q is a constant.

[Mathematical 16]

$$E[\rho(z)\rho(z_1)] = Q\delta(z-z_1) \tag{16}$$

Using Expression (16), expected values up to the second order with respect to $P_0$ and $P_1$ are calculated, and then a peak value of $\alpha$ cross-correlation coefficient of $P_0$ and $P_1$ is represented by Expression (17)

[Mathematical 17]

$$r_{peak} = \frac{E\{[P_0 - EP_0][P_1 - EP_1]\}}{\sqrt{E[P_0 - EP_0]^2}\sqrt{E[P_1 - EP_1]^2}} \tag{17}$$

When specific expected values are substituted in Expression (17), the peak value of the cross-correlation coefficient is represented by Expression (18).

[Mathematical 18]

$$r_{peak} = \left(\int_{-1/2}^{1/2} \cos\pi\, \beta l_p^2 x^2 dx\right)^2 \tag{18}$$

Further, since the pulse width D is $2l_p/v_g$ and the variation amount (difference between maximum and minimum) of Rayleigh frequency shift in a pulse is $\Delta v_R = bl_p = v_g\beta l_p/2$, $D\Delta v_R = \beta(l_p)^2$ is obtained, and thus, the peak value of the cross-correlation coefficient is eventually represented by Expression (19).

[Mathematical 19]

$$r_{peak} = \left(\int_{-1/2}^{1/2} \cos\pi\, D\Delta v_R x^2 dx\right)^2 \tag{19}$$

Figure 8A:
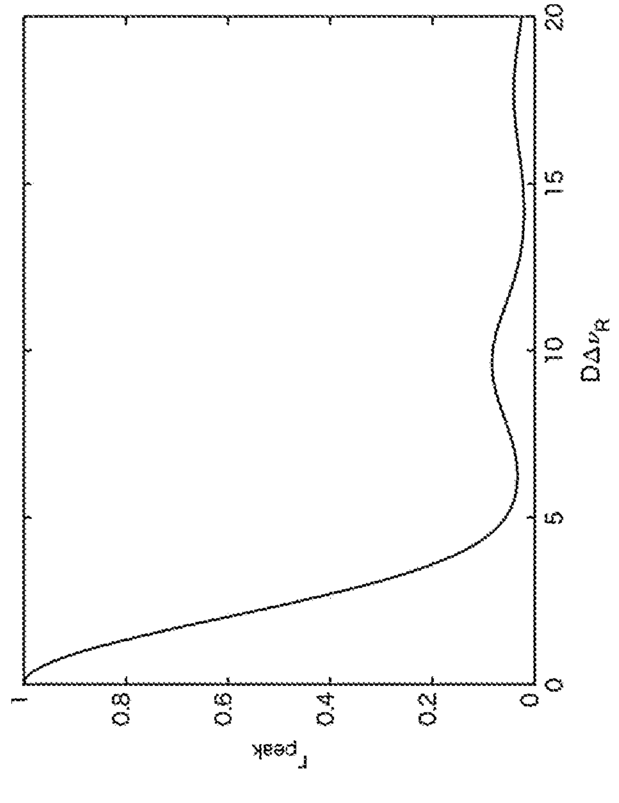
FIGS. 8A and 8B illustrate a peak value of α cross-correlation coefficient of Rayleigh frequency shift in a detection adjustment analysis method for non-uniform strain, in the RIP measurement device according to the present embodiment 1.
Figure 8B:
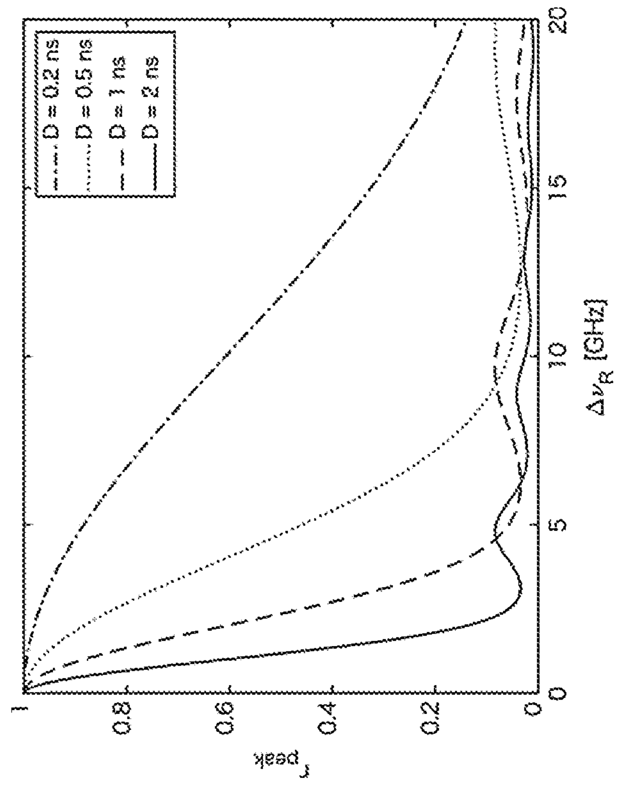

FIG. 8A and FIG. 8B are graphs obtained by plotting values of $r_{peak}$ calculated using Expression (19). As is found from FIG. 8A, $r_{peak}$ is 1 at $D\Delta v_R=0$, and as $D\Delta v_R$ increases, $r_{peak}$ sharply decreases to be close to 0 (zero). In a method of detecting the magnitude of Rayleigh frequency shift by a cross-correlation between spectra, the peak value $r_{peak}$ needs to be sufficiently great. Therefore, it is necessary to suppress reduction in the peak value, and for this purpose, reducing the pulse width is effective as is found from FIG. 8B (in actuality, when the pulse width is reduced, $\Delta v_R$ is also reduced proportionally, and thus, with both of these effects, reduction in the peak value is suppressed).

Then, for example, when $r_{peak}$ is 0.3, the value of $D\Delta v_R$ is calculated to be 3.11 (see FIG. 8A). With this value adopted, a condition of $D\Delta v_R\leq 3.11$ is a criterion for application limitation. In a case of using the slope of Rayleigh frequency shift, the above condition is represented by the following Expression (20).

[Mathematical 20]

$$b = \frac{dv_R}{dz} \leq \frac{0.319}{l_p^2}\text{GHz/m} \tag{20}$$

For example, in a case of the spatial resolution $l_p=0.5$ m, the above condition is $b\leq 1.28$ GHz/m.

[Detection Method for Rayleigh Frequency Shift in Case where Change in Strain or Temperature has Slope in Region]

If change in strain or temperature is constant in the region, the change can be detected as shift of a spectrum, but if the change has a slope, there is limitation in detection as described above. However, if electric field data before the intensity of light of the spectrum is calculated is available, it becomes possible to perform detection including a slope. Hereinafter, this method will be described.

To be brief, this is a method using spectrum deformation by a chirp. First, at a stage when reference data is obtained, using spectrum deformation by a chirp, spectra in cases where Rayleigh frequency shift has various slopes are stored as reference spectra. Next, at a stage when observation data is obtained, a spectrum obtained from the observation data (hereinafter, may be referred to as observation spectrum) is compared with the above reference spectrum, to take a correlation, whereby estimated values of the shift amount a and the slope b of the Rayleigh frequency are obtained.

[Spectrum Deformation by Chirp]

Electric field data Y(z, $\nu_k$) (k=0, 1, . . . , K−1) when the frequency ν is scanned at each distance z ($0 \le z \le L_f$, $L_f$: fiber length) is assumed to be provided. Here, $\nu_k$ is kΔν, and Δν is a frequency interval. In addition, K is the number of data in the frequency direction, and KΔν is the frequency bandwidth of the data. The slope b of the Rayleigh frequency shift is also discretized as $b_j$ (j=0, 1, . . . , J−1).

The reference spectrum is created by processing electric field data $Y_0$(z, ν) before change. Here, for convenience of calculation, the frequency ν is transformed to a spatial frequency $u=2\nu/v_g$ (unit: cycle/m), and the slope b of the Rayleigh frequency shift is transformed to $\beta=2b/v_g$(unit: cycle/$m^2$). Thus, the electric field data before change is represented by the following Expression (21).

[Mathematical 21]

$$Y_0(z, u_k) = \int_{-l_p/2}^{l_p/2} \rho(z+\zeta) e^{-2\pi i u_k \zeta} d\zeta, \quad k = 0, 1, \cdots, K-1 \tag{21}$$

In addition, using Expression (21), an electric field of the reference spectrum is represented by Expression (22).

[Mathematical 22]

$$Y_0(z, u_k; \beta_j) = \int_{-l_p/2}^{l_p/2} \rho(z+\zeta) e^{\pi i \beta_j \zeta^2} e^{-2\pi i u_k \zeta} d\zeta,\ k = 0, 1, \cdots, K-1,\ j = 0, 1, \cdots, J-1 \tag{22}$$

Next, in view of the fact that the right-hand side of the above Expression (22) is Fourier transform of a product of functions, in the above [Case where change in strain or temperature is not constant in pulse], this expression is considered to be convolution between Fourier transforms and thus is represented as shown by the following Expressions (23) to (25).

[Mathematical 23]

$$Y_0(z, u_k; \beta_j) = q(u_k; \beta_j) * Y_0(z, u_k) \tag{23}$$

-continued

[Mathematical 24]

$$q(u_k; \beta_j) = \int_{-\infty}^{\infty} e^{\pi i \beta_j \zeta^2} e^{-2\pi i u_k \zeta} d\zeta \tag{24}$$

[Mathematical 25]

$$Y_0(z, u_k) = \int_{-l_p/2}^{l_p/2} \rho(z+\zeta) e^{-2\pi i u_k \zeta} d\zeta \tag{25}$$

In Expression (24), q($u_k$, $\beta_j$) is Fourier transform of an infinite-length chirp, and is represented as an infinite-length chirp on the frequency axis, as shown by Expression (12). However, the infinite-length chirp has an infinitely great oscillation component and therefore it is difficult to treat the infinite-length chirp in a discretized manner in signal processing. That is, aliasing occurs no matter how much the sampling rate is increased.

Accordingly, using the fact that the spatial resolution is $l_p$, instead of Expression (23) and Expression (24), the following Expression (26) and Expression (27) equivalent thereto are used.

[Mathematical 26]

$$Y_0(z, u_k; \beta_j) = q_{l_p}(u_k; \beta_j) * Y_0(z, u_k) \tag{26}$$

[Mathematical 27]

$$q_{l_p}(u; \beta) = \int_{-l_p/2}^{l_p/2} e^{\pi i \beta \zeta^2} e^{-2\pi i u \zeta} d\zeta \tag{27}$$

Here, $q_{lp}$(u; β) is Fourier transform of the infinite-length chirp represented by Expression (28), and is represented by Expression (29) using a Fresnel integral function.

[Mathematical 28]

$$s(z; \beta) = \begin{cases} e^{\pi i \beta z^2}, & |z| \le l_p/2 \\ 0, & |z| > l_p/2 \end{cases} \tag{28}$$

[Mathematical 29]

$$\begin{aligned} q_{l_p}(u; \beta) &= \int_{-l_p/2}^{l_p/2} s(\zeta; \beta) e^{-2\pi i u \zeta} d\zeta \\ &= \begin{cases} \frac{1}{\sqrt{2|\beta|}} e^{-\pi i u^2/\beta} [Z(X_1) + Z(X_2)], & \beta > 0 \\ \delta(u), & \beta = 0 \\ \frac{1}{\sqrt{2|\beta|}} e^{-\pi i u^2/\beta} [\overline{Z(X_1)} + \overline{Z(X_2)}], & \beta < 0 \end{cases} \end{aligned} \tag{29}$$

Here, {—} represents complex conjugate, Z(·) is a Fresnel integral function (see the following Expressions (32) to (34)), and arguments $X_1$, $X_2$ are represented by Expression (30) and Expression (31), respectively.

[Mathematical 30]

$$X_1\left(l_p + \frac{2u}{|\beta|}\right)\sqrt{\frac{|\beta|}{2}} \tag{30}$$

[Mathematical 31]

$$X_2\left(l_p + \frac{2u}{|\beta|}\right)\sqrt{\frac{|\beta|}{2}} \tag{31}$$

Figure 9:
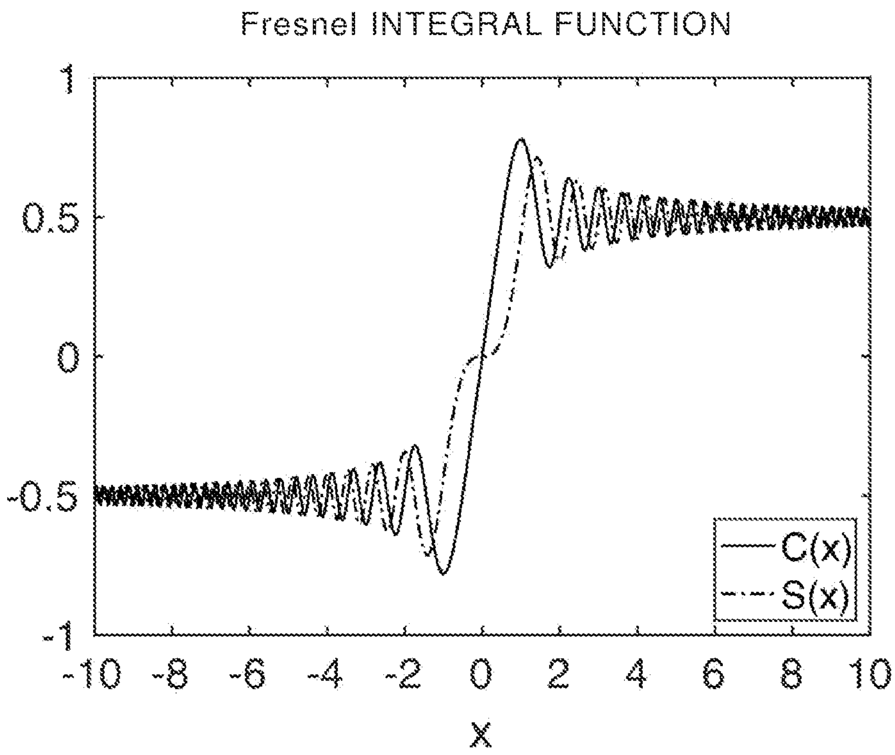
FIG. 9 illustrates a Fresnel integral used in the detection adjustment analysis method for non-uniform strain.
Figure 10A:
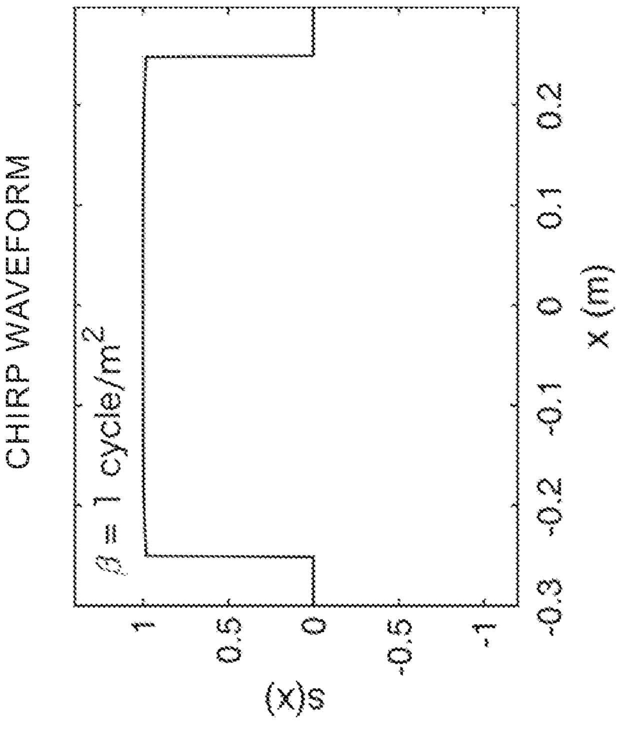
FIGS. 10A and 10B illustrate a finite chirp waveform and Fourier transform thereof in a case where strain change of non-uniform strain is 0.1 GHz/m.
Figure 10B:
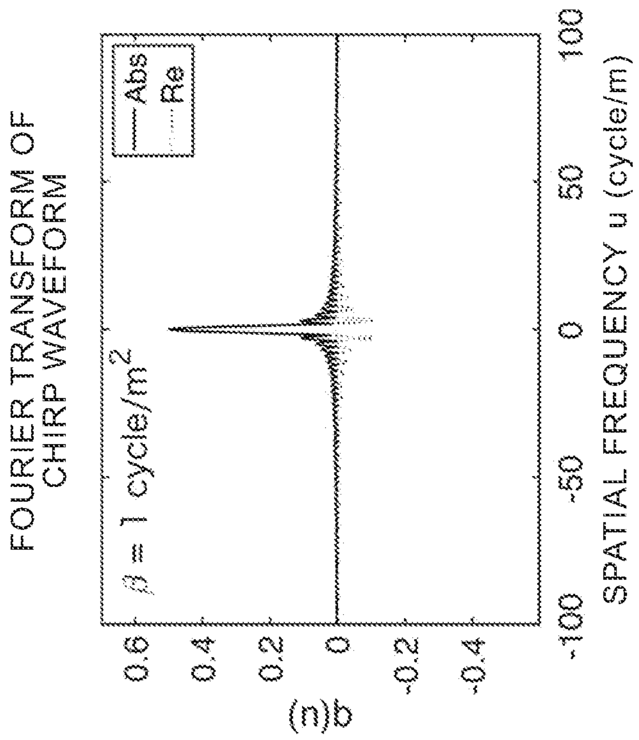
Figure 11B:
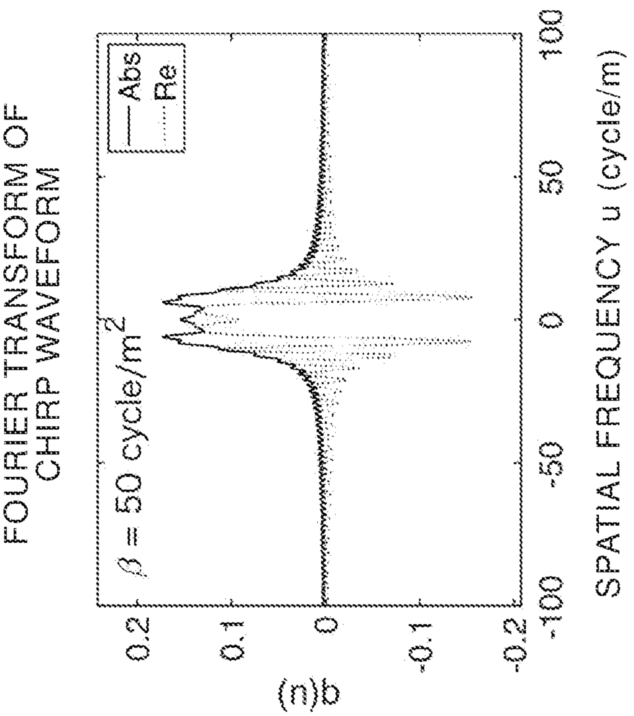
FIGS. 11A and 11B illustrate a finite chirp waveform and Fourier transform thereof in a case where strain change of non-uniform strain is 5 GHz/m.
Figure 11A:
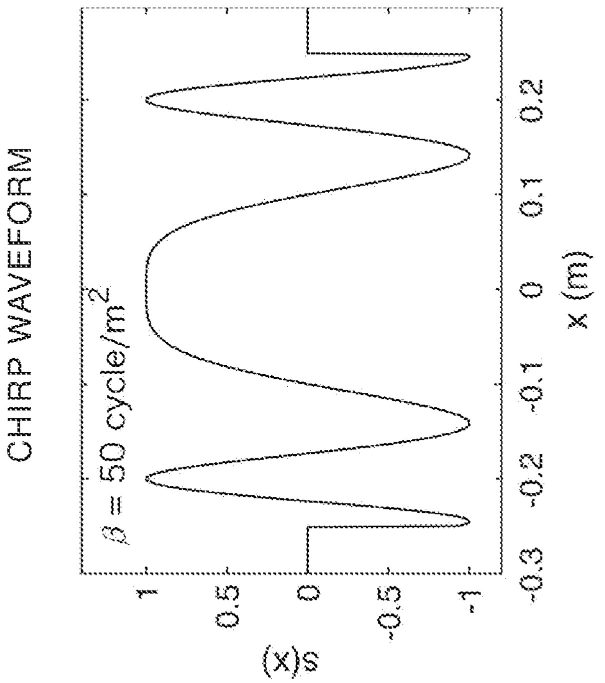
Figure 12A:
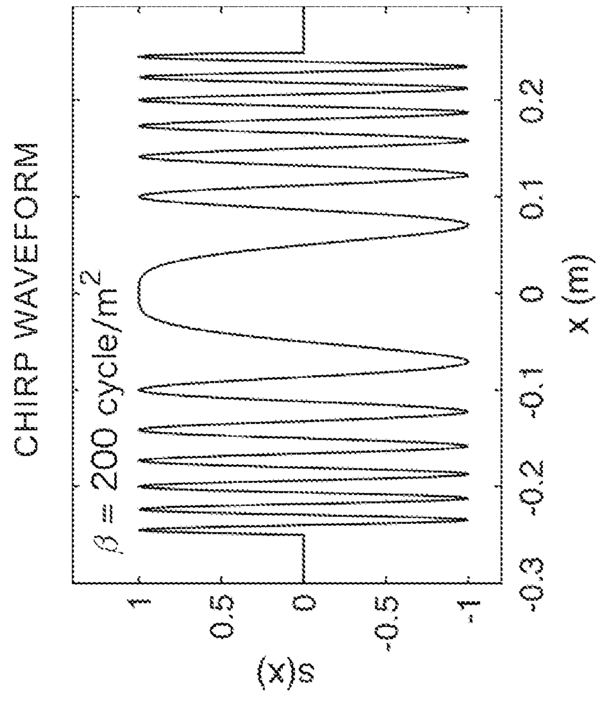
FIGS. 12A and 12B illustrate a finite chirp waveform and Fourier transform thereof in a case where strain change of non-uniform strain is 20 GHz/m.
Figure 12B:
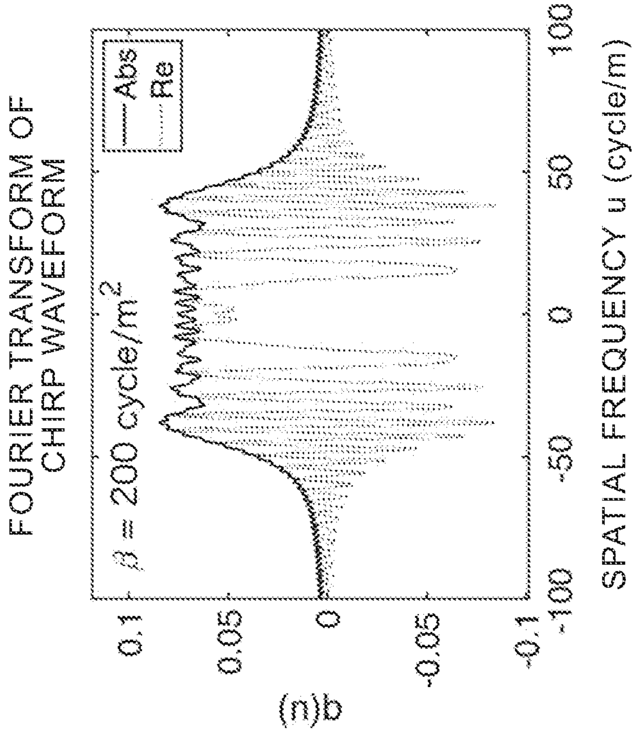

The above Fresnel integral function is defined by the following Expressions (32) to (34), and changes as shown in FIG. 9.

[Mathematical 32]

$$C(x)=\int_0^x \cos\left(\frac{\pi t^2}{2}\right)dt \tag{32}$$

[Mathematical 33]

$$S(x)=\int_0^x \sin\left(\frac{\pi t^2}{2}\right)dt \tag{33}$$

[Mathematical 34]

$$\begin{aligned} Z(x) &= C(x)+iS(x) \\ &= \int_0^x \exp\left(i\frac{\pi t^2}{2}\right)dt \end{aligned} \tag{34}$$

When x approaches ±∞, C(x) and S(x) approach ±0.5. Thus, it is found that, when $l_p$ approaches ∞, $q_{lp}(u;\ \beta)$ approaches q(u; β).

The u-direction length of $q_{lp}(u;\ \beta)$ needed for calculation differs depending on the bandwidth of s(z; β). FIG. 10A, FIG. 10B, FIG. 11A, FIG. 11B, FIG. 12A, and FIG. 12B respectively show finite chirp waveforms s(z; β) and Fourier transforms $q_{lp}(u;\ \beta)$ in cases of β=1, 50, 200 cycle/m$^2$ (corresponding to b=0.1, 5, 20 GHz/m).

Here, $l_p$ is set at 0.5 m. The spatial frequency bandwidth of s(z; β) is $l_p\beta$. Where the maximum value of the absolute value of β that is assumed is denoted by $B_{max}$, the maximum bandwidth is $l_p\beta_{max}$.

[Detection Method for Rayleigh Frequency Shift Including Slope]

Next, a detection method for Rayleigh frequency including a slope to the distance direction at each distance z will be described. In this detection method, if a sufficient correlation is obtained without considering the slope of the Rayleigh frequency shift, slope detection is not performed. Also here, for convenience of calculation, the spatial frequency $u=2\nu/v_g$ is used instead of the frequency ν, and $\alpha=2a/v_g$ and $\beta=2b/v_g$ are used instead of the parameters a, b of the Rayleigh frequency shift, in the following representation. These relationships are the same as the relationship $t=2z/v_g$ between the distance z and the round-trip time t of scattering light, and the same conversion applies.

[Detection Method 1]

In a detection method 1, the reference spectrum is calculated in a frequency domain.

(1) An electric field $Y_0(z,\ u_k)$ (k=0, 1, . . . , K−1) of the reference data is assumed to be provided. From this, a reference spectrum $P_0(z,\ u_k;\ \beta_j)$ is calculated for each value $\beta=\beta_j$ (j=0, 1, . . . , J−1) by the following method.

a) The Fourier transform $q_{lp}(u;\ \beta)$ of a chirp is calculated from the above Expressions (29) to (31). Here, Z(·) is the Fresnel integral function defined by Expression (32).

b) Convolution of the Fourier transform of the chirp and the reference data in a frequency domain is calculated (see Expression (35)).

[Mathematical 35]

$$Y_0(z,u;\beta)=q_{l_p}(u;\beta_j)\overset{u}{*}Y_0(z,u) \tag{35}$$

c) The reference spectrum is calculated by the following Expression (36).

[Mathematical 36]

$$P_0(z,u;\beta_j)=|Y_0(z,u;\beta_j)|^2 \tag{36}$$

(2) Every time the electric field $Y_1(z,\ u)$ ($0\le z\le L_f$, $u_{st}\le u\le u_{end}$) of observation data is obtained, a Rayleigh spectrum $P_1(z,\ u)$ is calculated using Expression (5).

(3) For each distance z ($0\le z\le L_f$), a cross-correlation coefficient between $P_0(z,\ u)$ and $P_1(z,\ u)$ when u is displaced is calculated (see Expression (37)), and if the maximum value of the correlation (see Expression (38)) is sufficiently great, the displacement at this time is used as an estimated value of α (see Expression (39)).

[Mathematical 37]

$$r_0(z,\alpha)=\text{Cross correlation }[P_0(z,u),P_1(z,u+\alpha)] \tag{37}$$

[Mathematical 38]

$$r_{0,max}(z)=\max_{\alpha} r_0(z,\alpha) \tag{38}$$

[Mathematical 39]

$$\hat{\alpha}(z)=\arg\max_{\alpha} r_0(z,\alpha) \tag{39}$$

(4) In this case, an estimated value of Rayleigh frequency shift $u_R$ in a region $[z-l_p/2,\ z+l_p/2]$ in a spatial coordinate system is calculated by Expression (40).

[Mathematical 40]

$$\hat{u}_R(\zeta)=\hat{\alpha}(z),\quad z-l_p/2<\zeta\le z+l_p/2 \tag{40}$$

If spatial sampling points are sufficiently dense, the estimated value may be evaluated by Expression (41).

[Mathematical 41]

$$\hat{u}_R(z)=\hat{\alpha}(z) \tag{41}$$

(5) At the value z where a maximum value $r_{max}(z)$ of the correlation coefficient is not sufficiently great, a cross-correlation coefficient $r(z,\ \alpha;\ \beta_j)$ of $P_0(z,\ u;\ \beta_j)$ and $P_1(z,\ u)$ when u is displaced is calculated for each value $\beta_j$ (j=0, 1, . . . , J−1) by Expression (42).

[Mathematical 42]

$$r(z,\alpha;\beta_j)=\text{Cross correlation }[P_0(z,u;\beta_j),P_1(z,u+\alpha)] \tag{42}$$

Then, a value $\beta_j$ where a maximum value $r_{max}(z, \beta_j)$ of the correlation coefficient represented by Expression (43) is maximized is calculated, and the value $\beta_j$ is used as an estimated value of $\beta$ (Expression (44)).

[Mathematical 43]

$$r_{max}(z, \beta_j) = \max_{\alpha} r(z, \alpha, \beta_j) \tag{43}$$

[Mathematical 44]

$$\hat{\beta}(z) = \arg\max_{\beta_j}(r_{max}(z, \beta_j)) \tag{44}$$

In addition, an estimated value of $\alpha$ is determined by the following Expression (45).

[Mathematical 45]

$$\hat{\alpha}(z) = \arg\max_{\alpha} r(z, \alpha, \hat{\beta}(z)) \tag{45}$$

(6) In this case, an estimated value of the Rayleigh frequency shift in the region $[z-l_p/2, z+l_p/2]$ in a spatial coordinate system is calculated by Expression (46).

[Mathematical 46]

$$\hat{u}_R(\zeta) = \hat{\alpha}(z) + \hat{\beta}(z)(\zeta - z),\ z - l_p/2 < \zeta \le z + l_p/2 \tag{46}$$

If spatial sampling points are sufficiently dense, the estimated value may be evaluated by Expression (47).

[Mathematical 47]

$$\hat{u}_R(z) = \hat{\alpha}(z) \tag{47}$$

[Detection Method 2]

In the above detection method 1, the reference spectrum is calculated by convolution in a frequency domain, whereas in a detection method 2, calculation of a product is performed in a spatial domain using Fourier transform and then the resultant value is returned to a frequency domain by inverse Fourier transform. The calculation time can be shortened in the detection method 2. In the detection method 2, the following (1a) is used instead of (1) in the detection method 1. Meanwhile, (2) to (6) in the detection method 2 are the same as (2) to (6) in the above detection method 1, and therefore the detailed description thereof is omitted here.

(1a) An electric field $Y_0(z, u_k)$ (k=0, 1, . . . , K−1) of the reference data is assumed to be provided. Here, $u_k=k\Delta u$ is a spatial frequency, and $\Delta u$ is a step size thereof. A step size of a spatial variable is defined as $\Delta\zeta=1/(K\Delta u)$, and the spatial variable is defined as $\zeta_n=n\Delta\zeta$ (n=0, 1, . . . , K−1). From this, a reference spectrum $P_0(z, u_k; \beta_j)$ is calculated for each value $\beta=\beta_j$ (j=0, 1, . . . , J−1) by the following method.

a) For each value $\beta=\beta_j$ (j=0, 1, . . . , J−1), a chirp $s(\zeta_n; \beta_j)$ on the spatial axis is calculated. For this purpose, first, $s(\zeta_n; \beta_j)$ is calculated in a range of $-K/2 \le n \le K/2-1$ by the following Expression (48).

[Mathematical 48]

$$s(\zeta_n; \beta_j) = \begin{cases} \exp(\pi i \beta_j \zeta_n^2), & |\zeta_n| \le l_p \\ 0, & |\zeta_n| > l_p \end{cases} \tag{48}$$

Thereafter, through extension in a circulative manner, Expression (49) is obtained, and $s(\zeta_n; \beta_j)$ (n=0, 1, . . . , K−1) is used in later calculation.

[Mathematical 49]

$$s(\zeta_{K-m}; \beta_j) = s(\zeta_{-m}; \beta_j),\ m = 1, 2, \ldots, K/2 \tag{49}$$

b) $Y_0(z, u_k)$ (k=0, 1, . . . , K−1) is subjected to inverse Fourier transform with respect to u, to perform calculation of Expression (50).

[Mathematical 50]

$$\tilde{p}_n = \sum_{k=0}^{k-1} Y_0(z, u_k)\exp[2\pi i u_k \zeta_n],\ n = 0, 1, \ldots, K-1 \tag{50}$$

c) For each value $\beta=\beta_j$ (j=0, 1, . . . , J−1), a product with the chirp $s(\zeta_n; \beta_j)$ (n=0, 1, . . . , K−1) is taken on the spatial axis, and then is subjected to Fourier transform (see Expression (51)).

[Mathematical 51]

$$\tilde{Y}_0(z, u_k; \beta_j) = \sum_{n=0}^{K-1} \tilde{p}_n s(\zeta_n; \beta_j)\exp(-2\pi i u_k \zeta_n),\quad k = 0, 1, \ldots, K-1 \tag{51}$$

d) For each value $\beta=\beta_j$ (j=0, 1, . . . , J−1), the reference spectrum is calculated by Expression (52).

[Mathematical 52]

$$P_0(z, u_k; \beta_j) = \left|\tilde{Y}_0(z, u_k; \beta_j)\right|^2,\ k = 0, 1, \ldots, K-1 \tag{52}$$

In particular, in a case of $\beta_j=0$, the reference spectrum is determined by the following Expression (53).

[Mathematical 53]

$$P_0(z, u_k; 0) \equiv P_0(z, u_k) = |Y_0(z, u_k)|^2,\ k = 0, 1, \ldots, K-1 \tag{53}$$

[Verification by Simulation]

Here, verification by simulation is performed using a method of using a chirp optical pulse and performing division to multiple frequencies on the reception side. Parameters used in the simulation are as follows.

a) Target Fiber

Figure 13B:
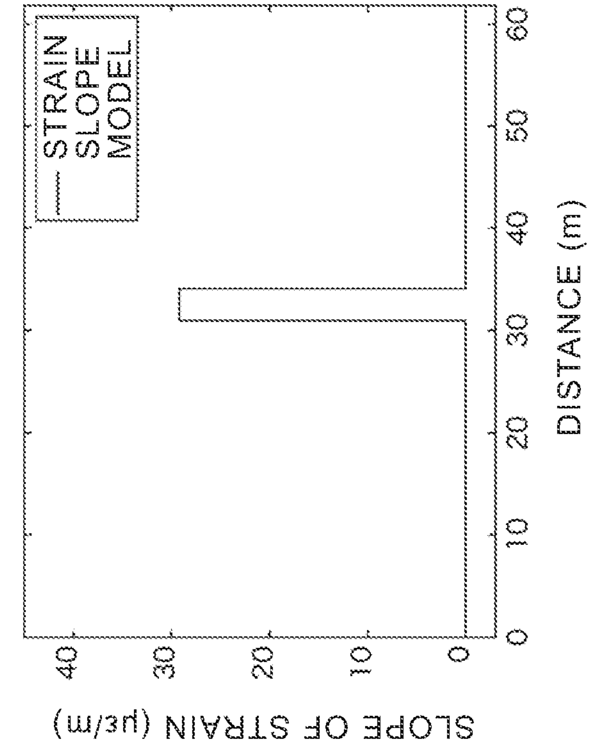
FIGS. 13A and 13B show a strain model and a strain slope model in the detection adjustment analysis method for non-uniform strain.
Figure 13A:
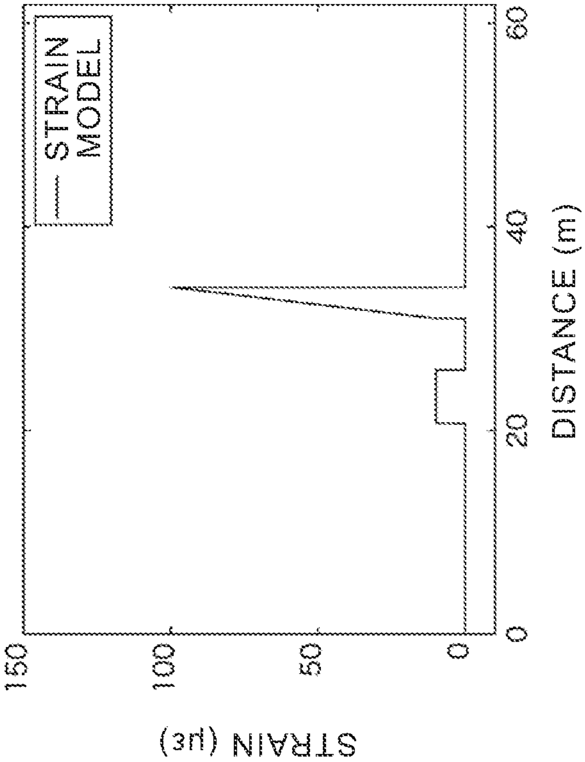

The length of an optical fiber is 50 m. An assumed strain distribution is shown in FIG. 13A and FIG. 13B. FIG. 13A shows a distribution of the magnitude of strain in the length direction of the optical fiber. FIG. 13B shows a distribution of change in the magnitude of strain in the length direction of the optical fiber. In both graphs, the horizontal axes indicate the length-direction position (unit: m) of the optical fiber.

From these graphs, it is found that there are strains in two regions in the optical fiber, uniform strain of 10με is present in a region of 20.7 m to 25.9 m, and strain of 10με to 100με with a constant slope of 30με/m is present in a region of 31.0 m to 34.1 m.

Here, the relationship between strain and Rayleigh frequency shift is represented by the following Expression (54).

[Mathematical 54]

$$\nu_R = c_{R\varepsilon}\Delta\varepsilon \tag{54}$$

Figure 14B:
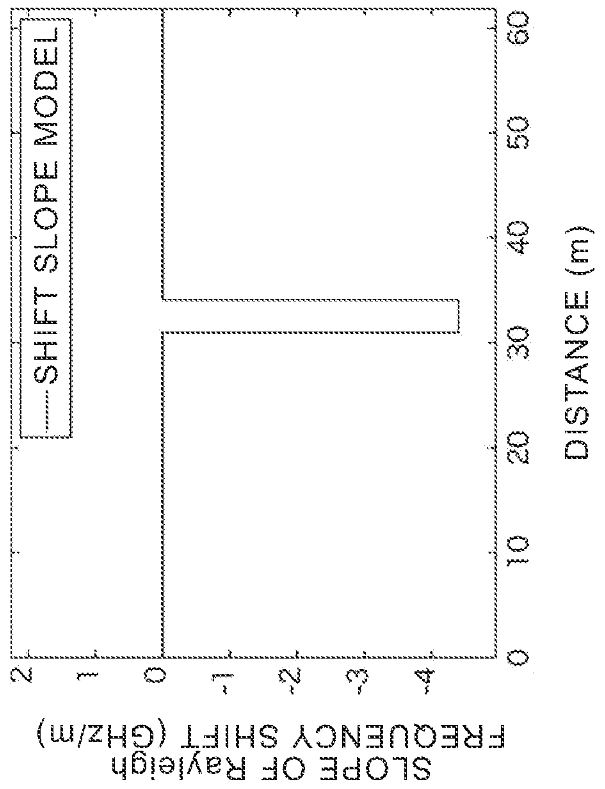
FIGS. 14A and 14B show a Rayleigh frequency shift model and a slope model thereof in the analysis method for detection adjustment for non-uniform strain.
Figure 14A:
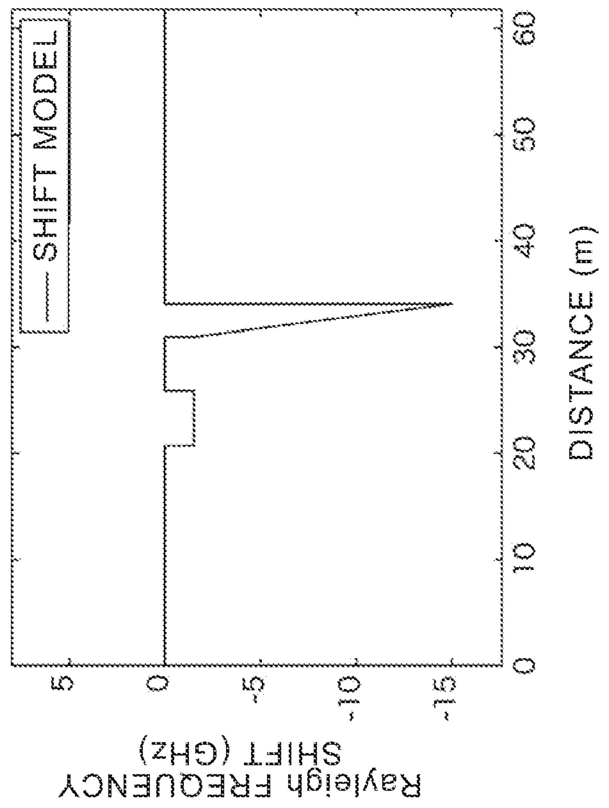

In Expression (54), $C_{R\varepsilon}$ is a transform coefficient from strain to Rayleigh frequency shift, and has a value of about −151 MHz/με. FIG. 14A and FIG. 14B show a distribution of Rayleigh frequency shift in the length direction of the optical fiber in a case of calculating the Rayleigh frequency shift from strain change by using the above value. In both graphs, the horizontal axes indicate the length-direction position (unit: m) of the optical fiber, as in FIG. 13A and FIG. 13B.

b) Chirp Optical Pulse

The pulse width is 80 ns, the pulse waveform is rectangular, the frequency sweep width is 4 GHz, the pulse power is 100 mW, the light source linewidth is 0.3 MHz, and the number of transmitted pulses is 16.

c) Frequency Arrangement

The frequency sweep range for an individual chirp optical pulse is $\nu_n$ to $\nu_n$+4 GHz, the frequency interval between pulses is $\nu_n$−$\nu_n$==3.825 GHz, the number of sub-bands (width: 200 MHz, interval: 25 MHz) that can be set for an individual chirp optical pulse is 153, and the number of sub-bands that can be set for 16 chirp optical pulses is 2448.

d) Signal Processing

Rayleigh scattering light based on a chirp pulse is received and then is demodulated in a divided manner for each sub-band of the chirp, whereby Fourier spectrums (both of reference spectrum and observation spectrum) are obtained. A correlation between a deformed reference spectrum and an observation spectrum is calculated to obtain Rayleigh frequency shift. Parameters of the slope in the simulation are as follows: Δb=0.5 GHz/m (Δβ=4.87 cycle/m$^2$), $b_j$=−60 to 60 GHz/m ($\beta_j$=−584.4 to 584.4 cycle/m$^2$), j=j=0, 1, . . . , J−1, and J=241.

Figure 15:
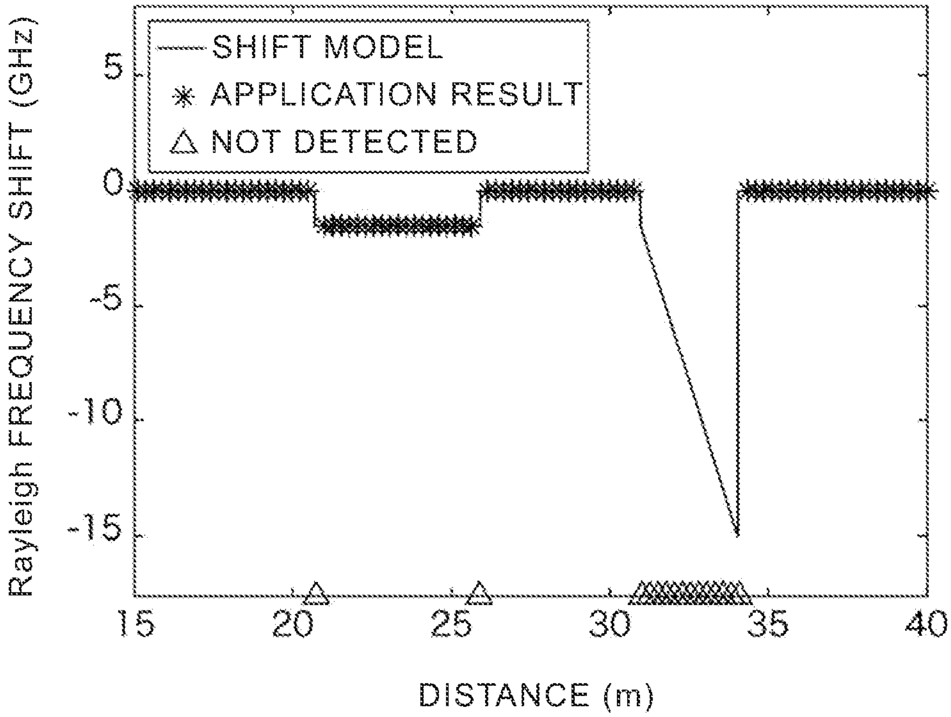
FIG. 15 illustrates a simulation result with a model not taking the slope of Rayleigh frequency shift into consideration in detection for non-uniform strain.

Hereinafter, simulation results will be described. First, for comparison, a result in a case of applying the conventional method of detecting spectrum shift without taking a slope into consideration is shown in FIG. 15. In a region of 31.0 m to 34.1 m, shift is about −4.5 GHz/m, and the shift cannot be detected at all in this region. Since the spatial resolution is 0.5 m, the detection limit for a slope expected from Expression (20) is 1.28 GHz/m, and this limit is exceeded in the region of 31.0 m to 34.1 m.

Figure 16B:
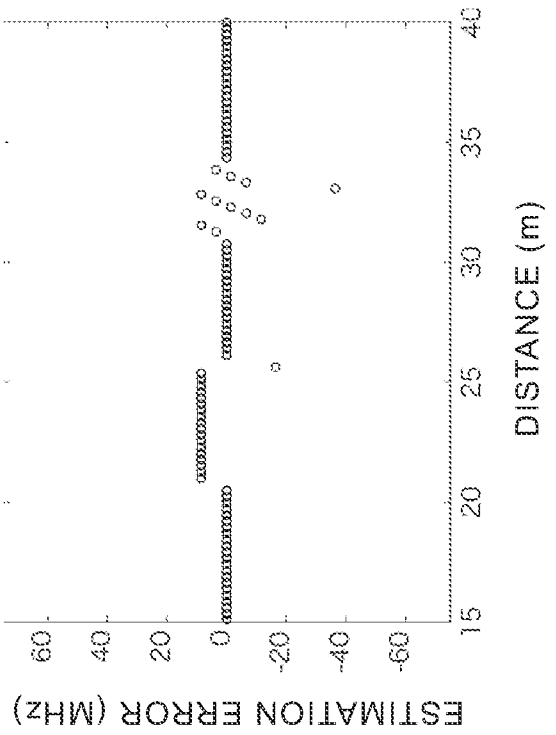
FIGS. 16A and 16B illustrate a simulation result in a case of calculating a distribution of Rayleigh frequency shift by applying the analysis method for detection adjustment for non-uniform strain.
Figure 16A:
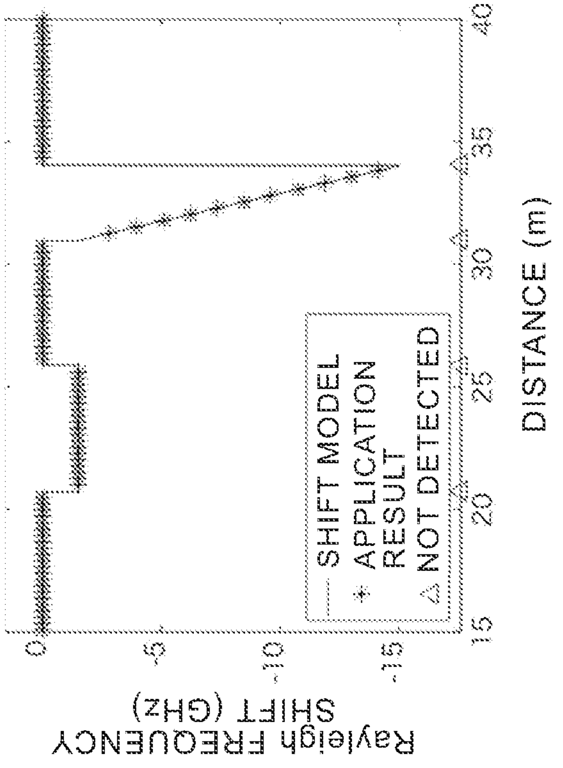

Next, a result when Rayleigh frequency shift is detected through spectrum deformation in a case of using the present detection method with a slope taken into consideration is shown in FIG. 16A, FIG. 16B, FIG. 17A, FIG. 17B, FIG. 18A, and FIG. 18B. FIG. 16A shows a detection result of Rayleigh frequency shift. Detection has successfully been made at all points other than four points (20.7 m, 25.9 m, 31.0 m, 34.0 m) where Rayleigh frequency shift changes in a step shape. FIG. 16B shows estimated error of Rayleigh frequency shift. Except for two points (25.2 m, 33.1 m), error falls into a range of quantization error. The quantization error is caused due to the fact that a lag when a cross-correlation is acquired with the step of the frequency of the Fourier spectrum set at 25 MHz becomes an integer multiple of 25 MHz.

Figure 17B:
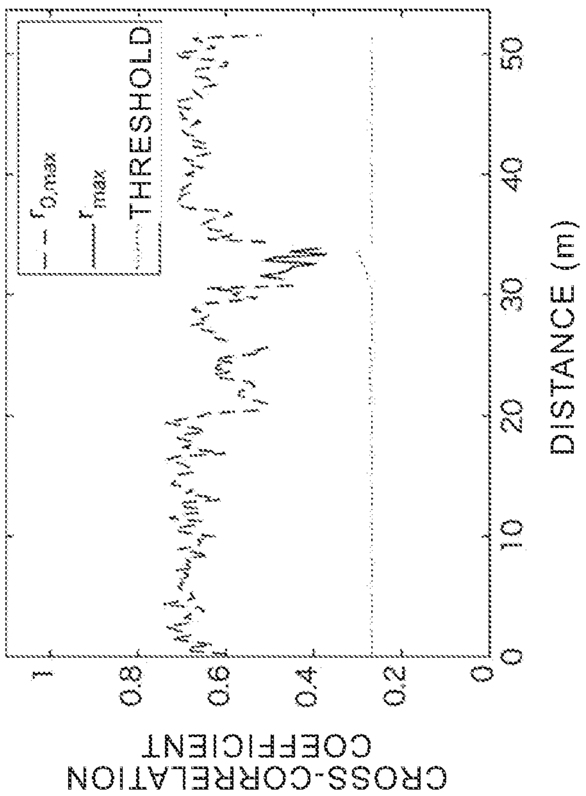
FIGS. 17A and 17B illustrate a simulation result in a case of calculating a distribution of the slope of Rayleigh frequency shift by applying the analysis method for detection adjustment for non-uniform strain.
Figure 17A:
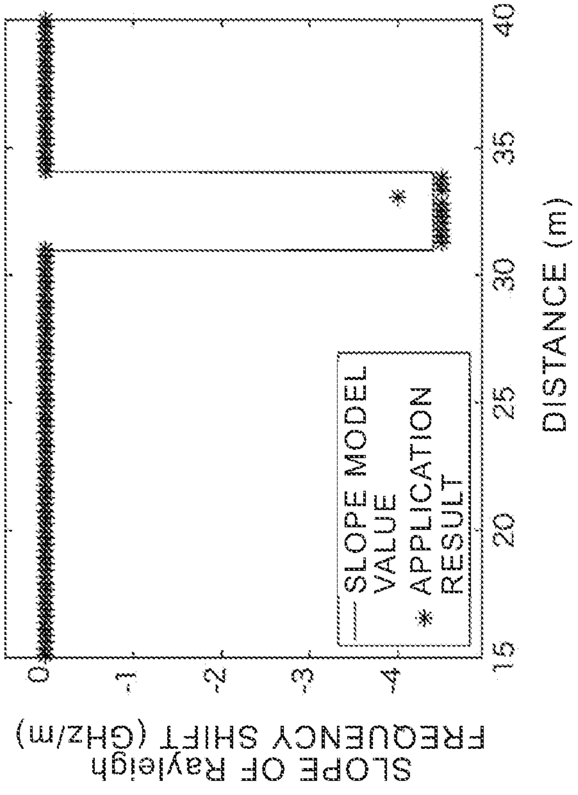

FIG. 17A shows an estimation result of the slope of Rayleigh frequency shift. It is found that the magnitude of the slope has successfully been estimated except for one point (33.1 m). FIG. 17B shows a peak value of α cross-correlation coefficient and a threshold therefor.

Figure 18B:
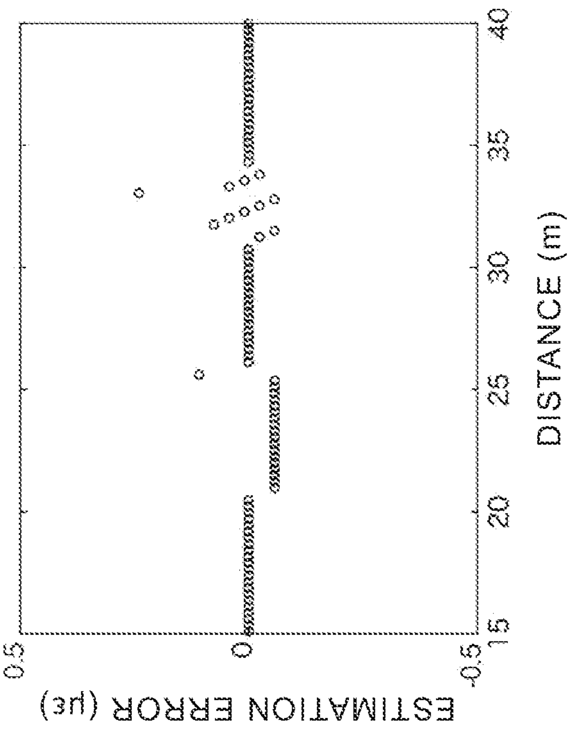
FIGS. 18A and 18B illustrate a simulation result in a case of calculating a distribution of strain by applying the analysis method for detection adjustment for non-uniform strain.
Figure 18A:
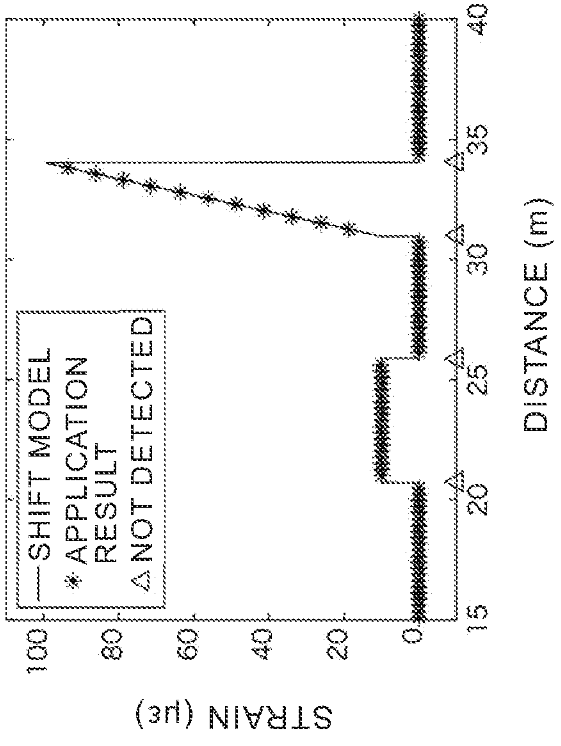

FIG. 18A shows a strain estimated value obtained through transform from the Rayleigh frequency shift to strain using Expression (54). FIG. 18B shows estimated error of the strain estimated value obtained through transform from the Rayleigh frequency shift to strain using Expression (54).

From the simulation results described above, it is found that, by using the present detection method, in a case where the spatial resolution is 0.5 m, it is possible to detect Rayleigh frequency shift with high accuracy even if the slope of strain has a great value of 30με/m (the slope of Rayleigh frequency shift is −4.5 GHz/m).

Thus, it has been shown that, by introducing the analysis method N1, it becomes possible to detect Rayleigh frequency shift even in a case where change in strain or temperature locally changes. That is, it has been shown that, by using the analysis method N1, the reference spectrum is deformed with chirps having various chirp rates, and cross-correlations between these spectra and an observation spectrum are acquired, whereby the shift amount including the slope can be measured. In addition, in the above analysis method N1, it has been clarified that, in a case where change in strain or temperature has a slope, a spectrum is not only shifted but also is deformed by a chirp.

Further, as a specific result, in comparison with a case where the spatial resolution is 0.15 m, it has been clarified that, even if there is such a great slope (e.g., a slope of 50 GHz/m) that could not be detected by the conventional detection method, a shift amount can be detected.

As described above, it has been shown that, by the analysis method N1, the Rayleigh intensity pattern measurement device that is effective for a non-uniform strain distribution can be obtained.

Further, the Rayleigh intensity pattern measurement device of embodiment 1 achieves a sufficient measurement range corresponding to the second problem by the method of scanning multiple chirp optical pulses stepwise (making chirp signals pulsed at respective steps). In general, in order to generate the chirp optical pulse, a narrow-linewidth LD is needed. For example, in the TGD-DAS technology of conventional art No. 6 described above, an LD having a linewidth of 100 Hz is needed. In the Rayleigh intensity pattern measurement device of the present embodiment 1, the linewidth condition is relaxed and an LD having a linewidth of 300 kHz for which a commercial LD is available is also applicable. Accordingly, such circumstances will be described below.

As shown in FIG. 6 and FIG. 7 described above, the Rayleigh intensity pattern measurement device of embodiment 1 drives the reception system using a plurality of chirp pulses and acquires a Rayleigh backscatter signal using heterodyne detection, in the methods 1 to 3.

More specifically, using a matched filter method, simulation data is generated from a plurality of chirp pulses, a set of sub-bands is extracted on the basis of the simulation data, and the sub-bands are combined, thereby forming a Rayleigh intensity pattern (RIP) for obtaining a cross-correlation.

Hereinafter, the details of a process until a Rayleigh intensity pattern is formed in the present embodiment 1 will be specifically described with reference to Example.

[Example for Rayleigh Intensity Pattern Formation]

Figures 19, 20:
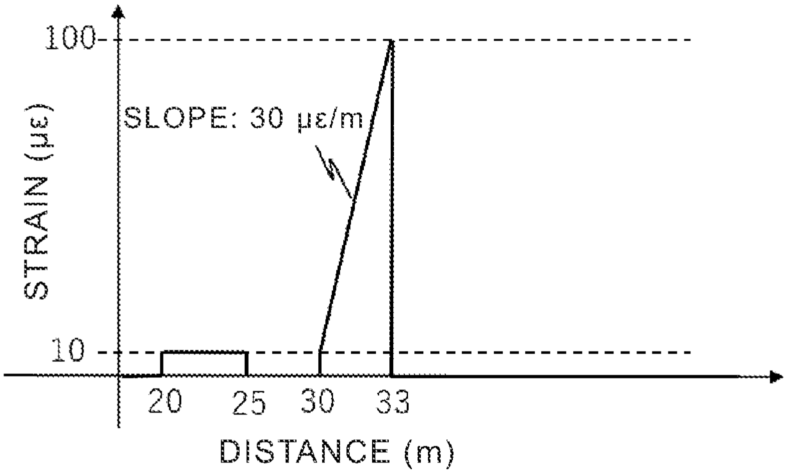
FIG. 19 illustrates strain distribution data for forming a Rayleigh intensity pattern, used in description of Example of the RIP measurement device according to the present embodiment 1.
FIG. 20 illustrates parameters used in description of a scanning method for a plurality of chirp pulses simulating a laser beam, used for driving a reception unit, in the Rayleigh intensity pattern measurement device.

First, FIG. 19 shows data of a strain distribution used in this simulation. This is basically similar to the strain distribution described above in FIGS. 14A and 14B. A model used here is a strain distribution having constant strain of 10με in a region of 20 m to 25 m and non-uniform strain with a slope of 30με/m in a spatial resolution space in a region of 30 m to 33 m. In regions other than the above regions, there is no strain (strain is zero).

Figure 21:
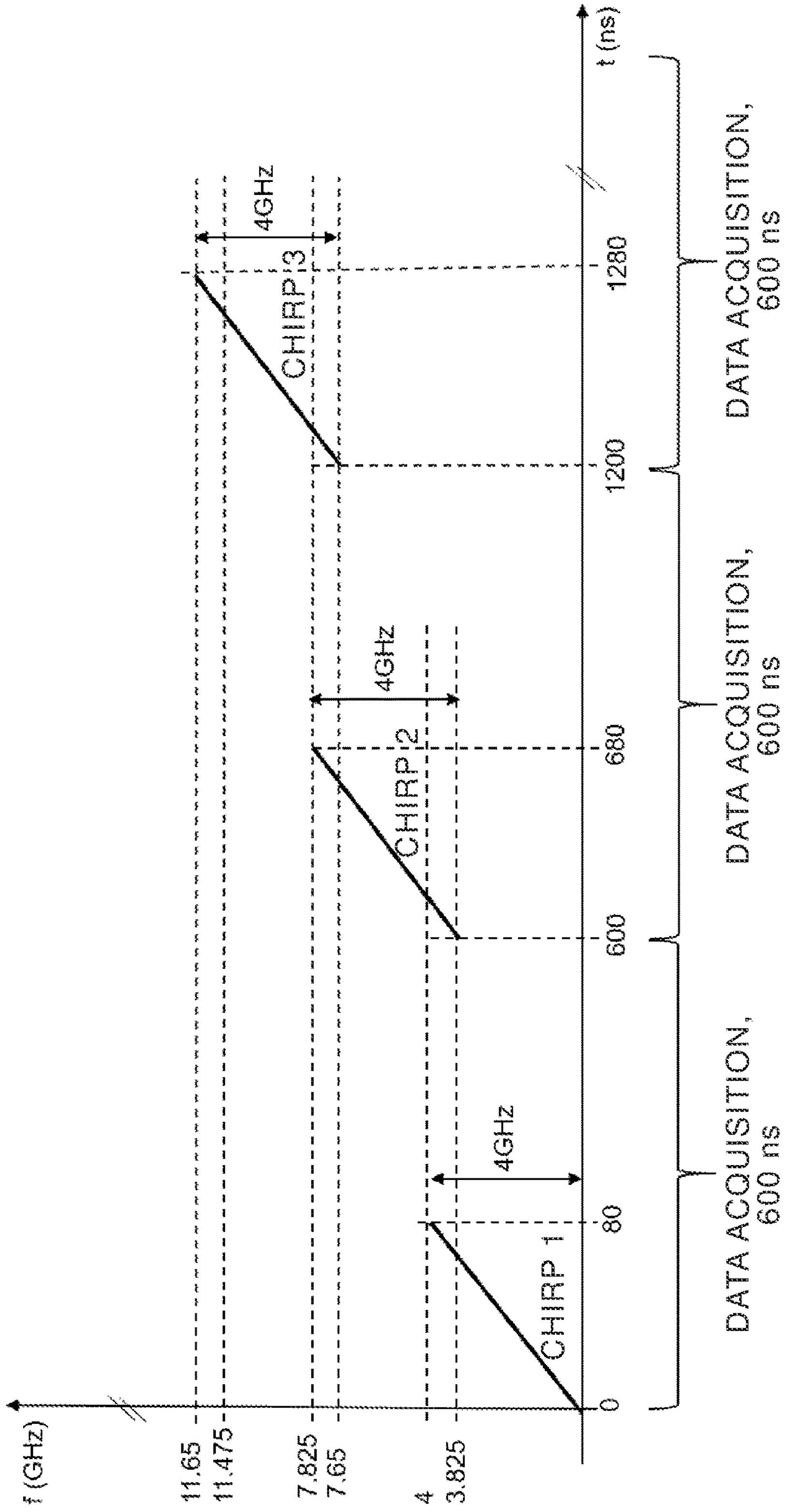
FIG. 21 is a model graph illustrating a method for scanning a plurality of chirp pulses stepwise.

Next, a method for stepwise scanning sixteen multiple chirp pulses simulating a laser oscillation beam used for measurement for a strain distribution, will be described with reference to FIG. 20 and FIG. 21. FIG. 20 shows main parameters used in this simulation. FIG. 21 specifically shows a part of a configuration of the multiple chirp pulses used in this simulation.

As is found from FIG. 20 and FIG. 21, setting was made such that frequencies were overlapped between chirp optical pulses (the overlap frequency band between adjacent pulses is 0.175 GHz), to generate an RIP with no frequency step between multiple pulses, and sixteen multiple chirp pulses were scanned stepwise, to achieve a frequency range of 0.1 GHz to 61.275 GHz which is a sufficient measurement range, as described in detail later.

Here, as shown in FIG. 20, in the present Example, the laser linewidth is 300 kHz and the pulse width is 80 ns. The laser linewidth is one of the most important parameters for causing phase noise of a Rayleigh backscatter light signal.

Figure 22:
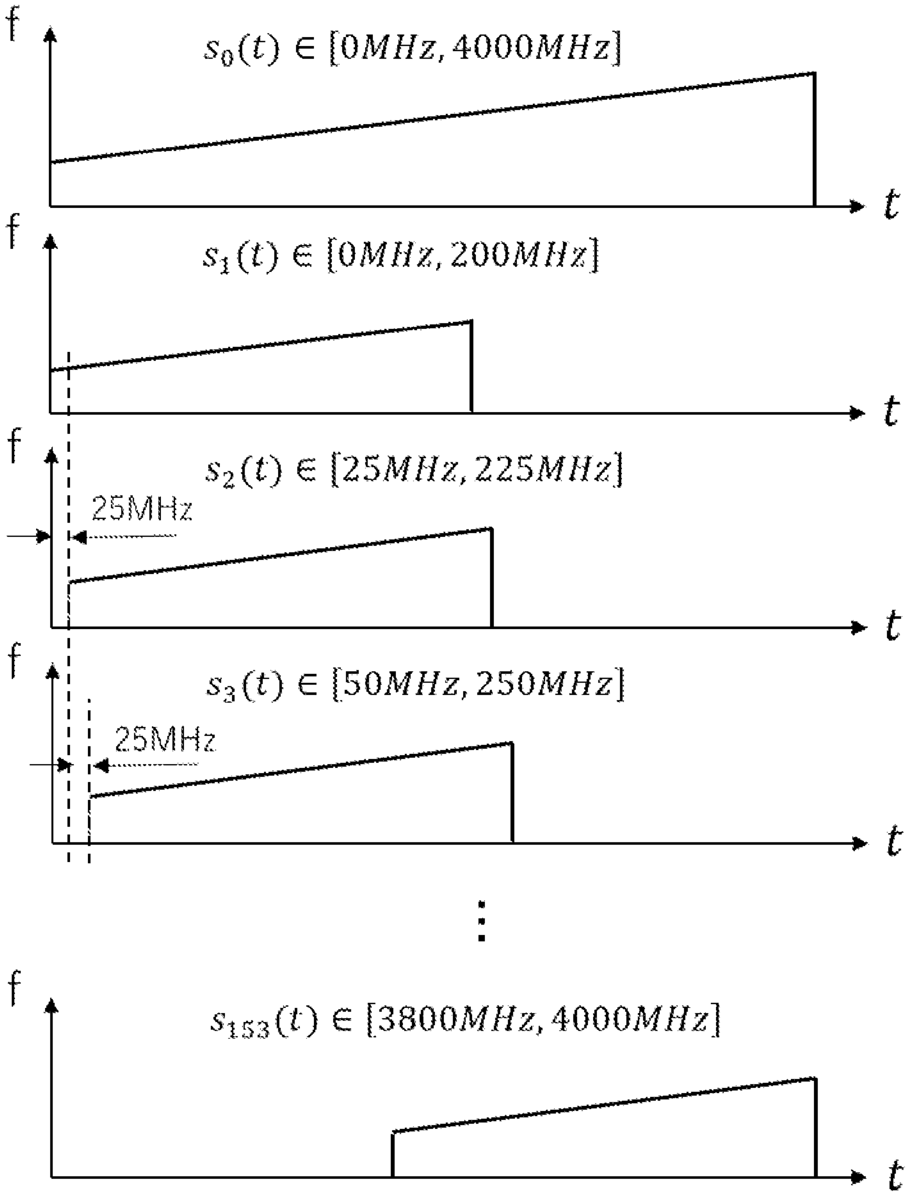
FIG. 22 illustrates a configuration of matched filters for extracting sub-bands from respective chirp pulses.

Next, matched filters in the present Example will be described with reference to FIG. 22. The matched filters for extracting sub-bands are defined by a configuration as shown in FIG. 22. A single-pulse chirp signal sweeps a frequency band of 4 GHz and is represented by the following Expression (55).

[Mathematical 55]

$$s_o(t) = rect(t/t_o)\exp\{i(2\pi f_o t + \pi\kappa t^2)\} \quad (55)$$

Here, $f_0$ is a start frequency, K is a chirp rate, $t_c$ is a pulse width, and rect(·) represents a rectangular function.

As is found from FIG. 20 and FIG. 22, the sub-band width was 200 MHz, and the interval between adjacent bands was 25 MHz. Thus, matched filters s (t) (n=1, 2, . . . , 153) for respective sub-bands are determined in accordance with the definition described above.

Figure 23:
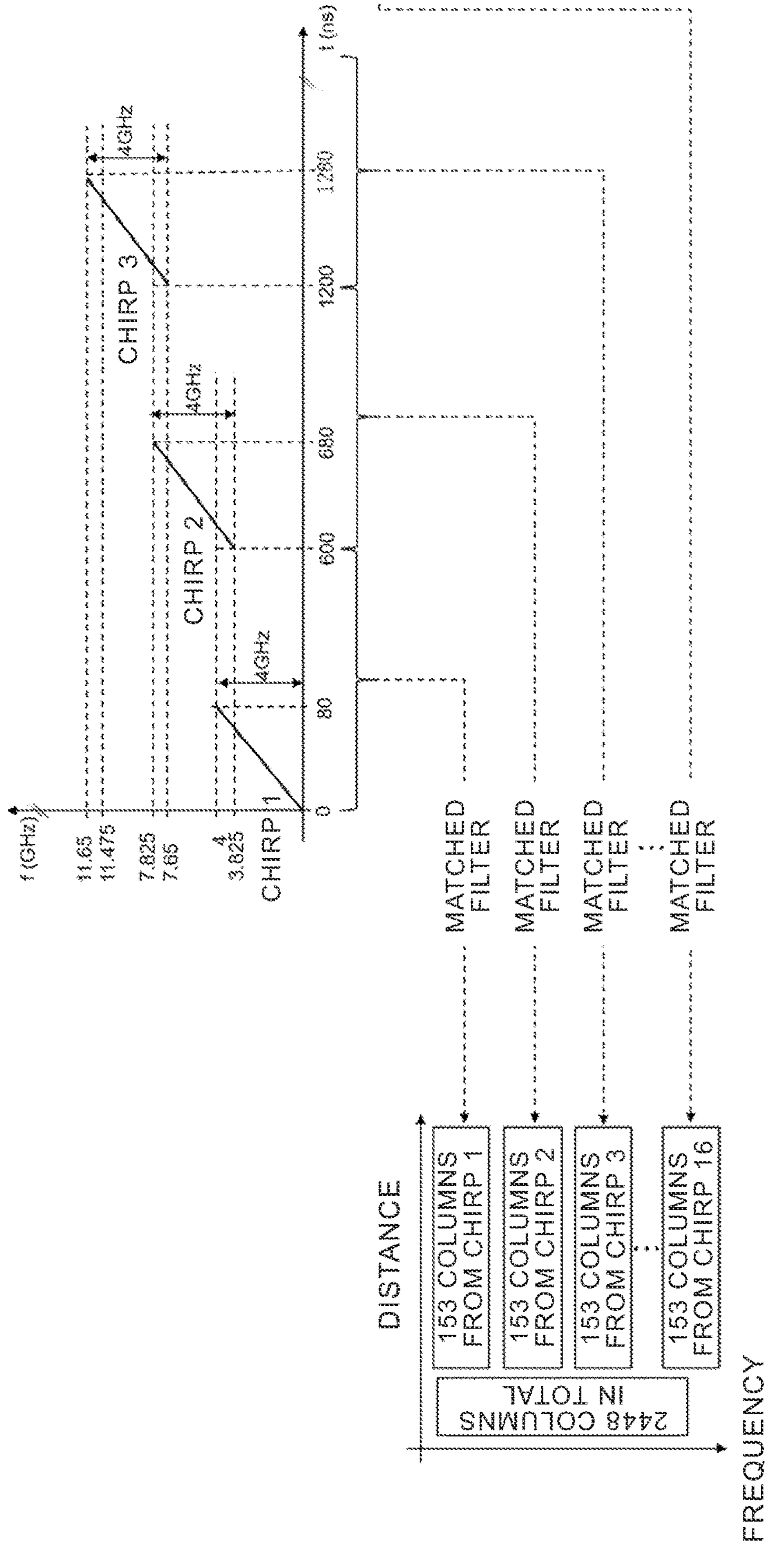
FIG. 23 illustrates a sequential method until extracting traces indicating specific frequencies along a distance of a measurement target from each chirp pulse.

From the above, a trace indicating a specific frequency along a distance can be calculated by taking a cross-correlation between the matched filter and acquired data. This operation is referred to as sub-band extraction, and as a result, a total of 2448 traces can be extracted from all simulation data (see FIG. 23). Here, the center frequency of the sub-band is used for representing the frequency of the corresponding trace and is calculated by the following Expression (56).

[Mathematical 56]

$$f_q = 200\text{ MHz}\times 0.5 + (q-1)\times 25\text{ MHz},\ q = 1, 2, \ldots, 2448 \quad (56)$$

Figure 24A:
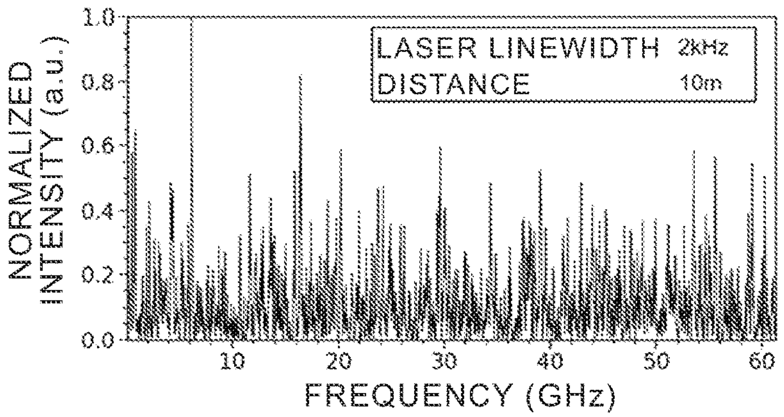
FIGS. 24A to 24C show examples of the RIP which is the intensity of a Rayleigh backscatter signal with respect to a laser frequency, for respective laser linewidths.
Figure 24B:
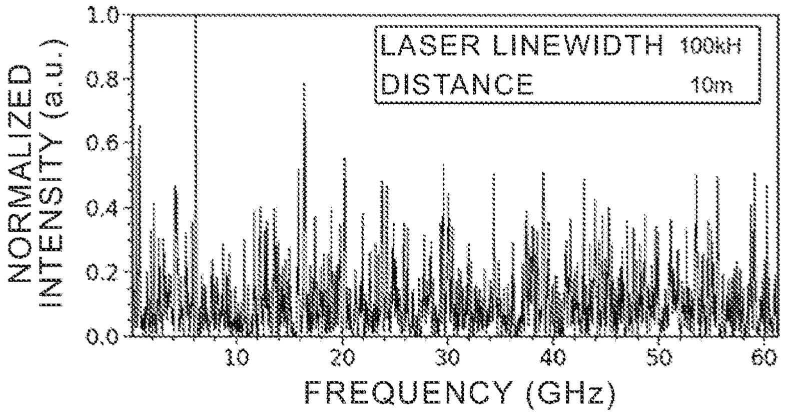
Figure 24C:
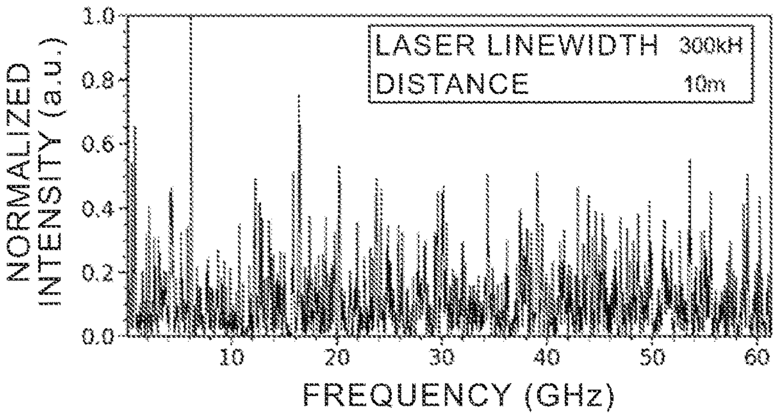

That is, the Rayleigh backscatter spectrum is composed of 2448 traces and covers frequencies of 0.1 GHz to 61.275 GHz calculated by Expression (56). The RIP is defined as the intensity of a Rayleigh backscatter signal at the corresponding laser frequency. Since the laser frequency before chirping is 193548.487 GHz, the absolute frequency of the RIP is represented as 193548.587 GHz to 193609.762 GHz. Therefore, the RIP can be stored with the absolute frequency. As long as the state of the optical fiber is not changed, it is possible to acquire an RIP by sweeping with the same absolute frequency even if a measurement apparatus is changed. FIG. 24A, FIG. 24B, and FIG. 24C show examples of RIPs at a distance of 10 m. Here, FIG. 24A shows an RIP in a case where the laser linewidth is 2 kHz, FIG. 24B shows an RIP in a case where the laser linewidth is 100 kHz, and FIG. 24C shows an RIP in a case where the laser linewidth is 300 kHz. From these graphs, it is found that the influence of the laser linewidth is almost negligible when the linewidth is 2 kHz to 300 kHz.

As described above, in the Rayleigh intensity pattern measurement device of the present embodiment 1, a sufficient measurement range can be achieved by the method of scanning multiple chirp optical pulses stepwise. In addition, it has been shown that an RIP that can be used for measurement can be obtained even when the laser linewidth is 300 kHz.

As described above, with the Rayleigh intensity pattern measurement device of the present embodiment 1, it is possible to provide a high-speed and high-accuracy measurement device for strain or temperature that achieves three features, i.e., high spatial resolution, high-speed measurement, and a sufficient measurement range, at the same time.

In addition, RIP information can be managed over a long period of several tens of years or longer, and high-accuracy RIP information can be continuously acquired during a measurement period.

In addition, even if there is a non-uniform strain distribution in a region not longer than the spatial resolution, frequency shift can be obtained by the detection adjustment analysis method.

Further, in measuring an RIP with an assured absolute frequency using an optical fiber, accuracy of the absolute frequency can be assured at about the linewidth of the LD, the range of the measured RIP includes a practically sufficient range of temperature/strain change, and means for correcting correlation failure that has occurred non-uniformly on a spatial distribution is provided, whereby a reliable correlation value can be continuously obtained with respect to the initially measured RIP and it becomes possible to perform high-speed measurement that can also cope with dynamic strain change.

In addition, it is possible to measure dynamic strain even in a case of using an LD having an insufficient linewidth of about 300 kHz, for example.

Embodiment 2

Next, a Rayleigh intensity pattern measurement device according to embodiment 2 will be described focusing on difference from embodiment 1, with reference to the drawings. The Rayleigh intensity pattern measurement device according to embodiment 2 is different only in that an analysis method N2 which is an analysis method different from the analysis method N1 for coping with non-uniform strain is used, as compared to the above description. Accordingly, the analysis method N2 will be described below.

[Analysis Method N2]

In the analysis method N2, an approximation components decoding (hereinafter, may be referred to ACD) method based on discrete wavelet transform as described below is used so that an appropriate correlation is obtained even in a case where there is non-uniform strain. Hereinafter, the details of this method and an example in which this method was verified using measurement data of Rayleigh frequency shift (hereinafter, may be abbreviated as RFS) will be described.

The ACD method is roughly composed of the following four steps.

(a) Data preparation step (a preprocessing step; a step of acquiring data to be decoded)

(b) Data decomposition step (a step of decomposing data into an approximate data part and a detailed data part at a predetermined decomposition level by discrete wavelet transform)

(c) Data reconstruction step (a step of reconstructing data by inverse wavelet transform with the detailed data part set at zero)

(d) Correlation coefficient calculation and determination step (a step of calculating a cross-correlation coefficient on the basis of the reconstructed data, to obtain such a correlation coefficient that the calculated correlation coefficient is equal to or greater than a threshold)

The reason why the analysis method N2 is referred to as ACD method is that, in particular, original data is decomposed into an approximate data part and a detailed data part by wavelet transform and then, with the detailed data part set at zero, data of only the approximate data part is subjected to inverse wavelet transform to reconstruct data, as performed in a combination of the above steps (b) and (c).

By using the ACD method, it is possible to calculate appropriate RFS even in a case where a correlation coefficient is calculated on the basis of signal data of Rayleigh scattering light that would be detected as non-uniform strain in the conventional method. Then, on the basis of the calculated RFS, target strain can be detected. Next, the details of each of the above steps will be described in order with reference to the drawings.

[Data Preparation Step]

Figure 3:
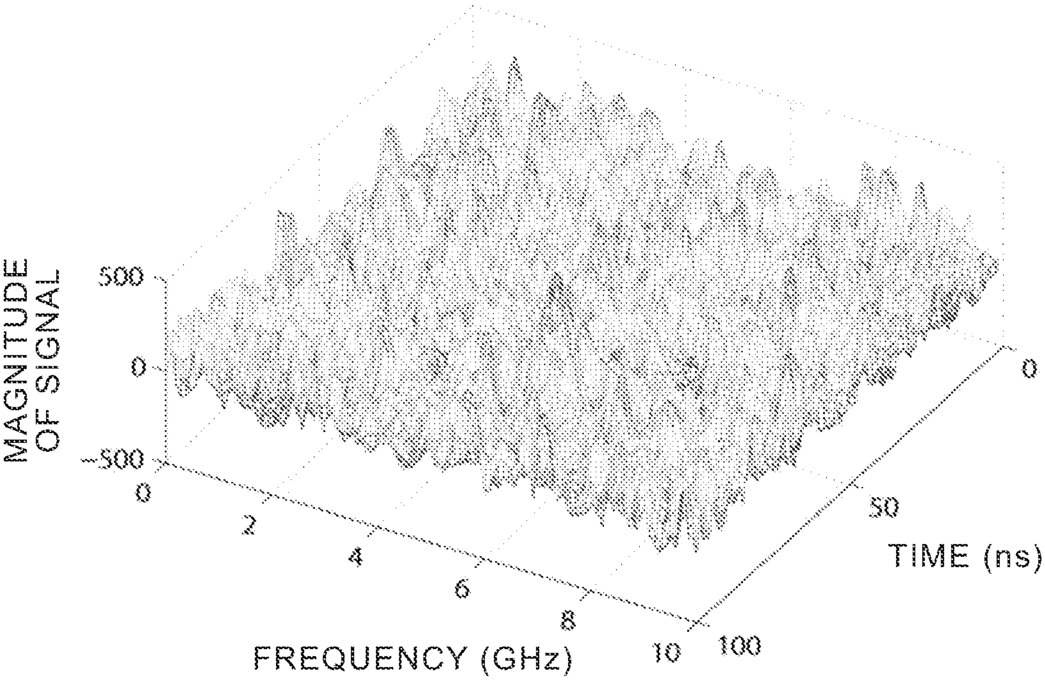
FIG. 3 shows an example of an RIP distribution obtained by the Rayleigh backscatter light method.
Figure 4A:
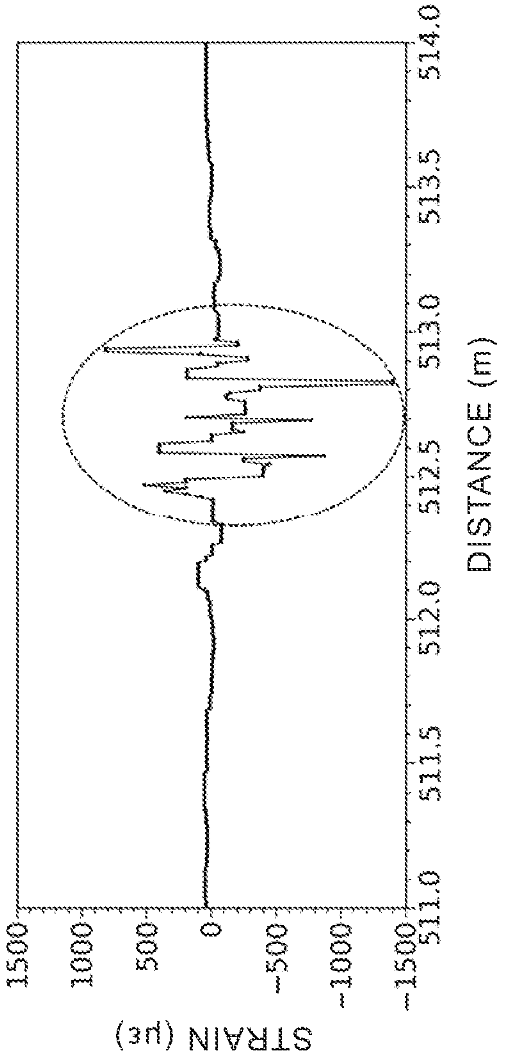
FIGS. 4A and 4B show an example of a correlation function and strain of a bar member measured by the Rayleigh backscatter light method.
Figure 4B:
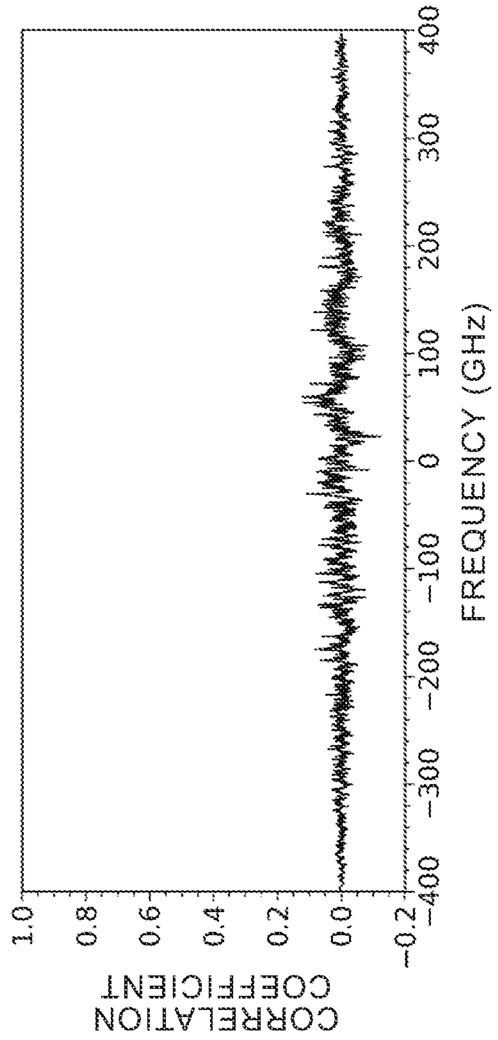
Figure 5:
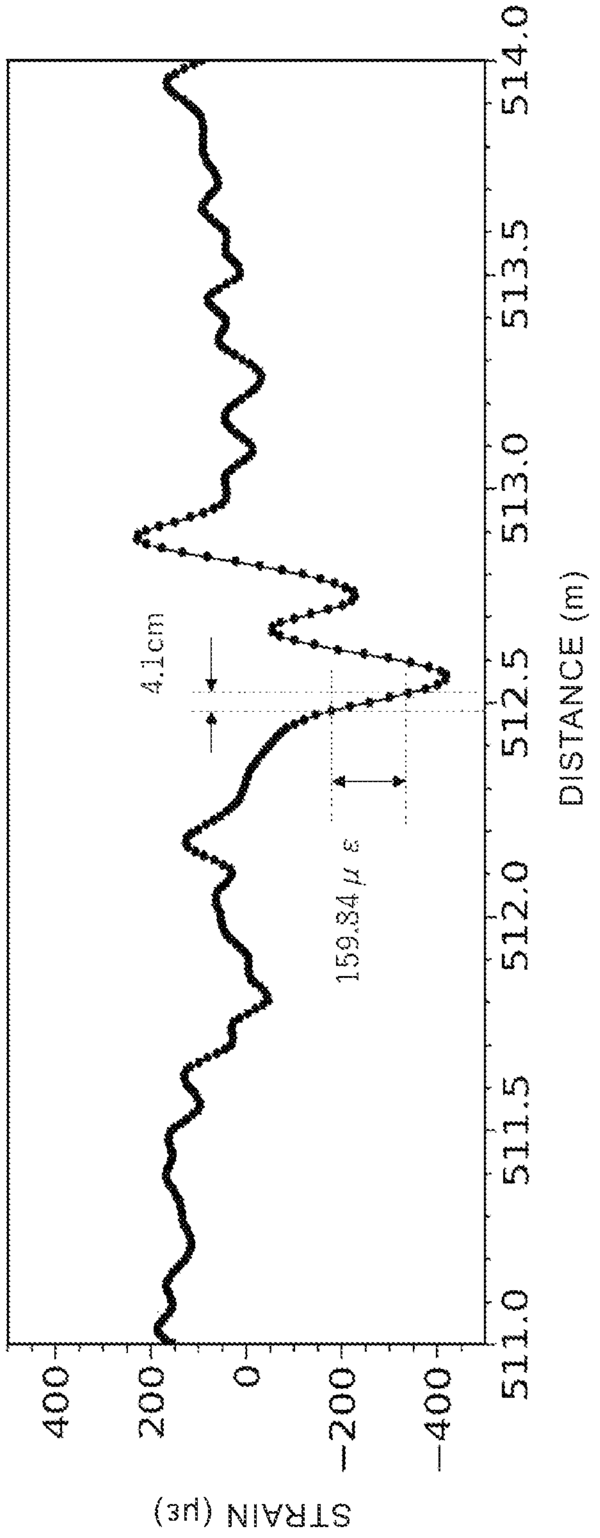
FIG. 5 shows strain data of a bar member measured by the Brillouin backscatter light method.
Figure 25A:
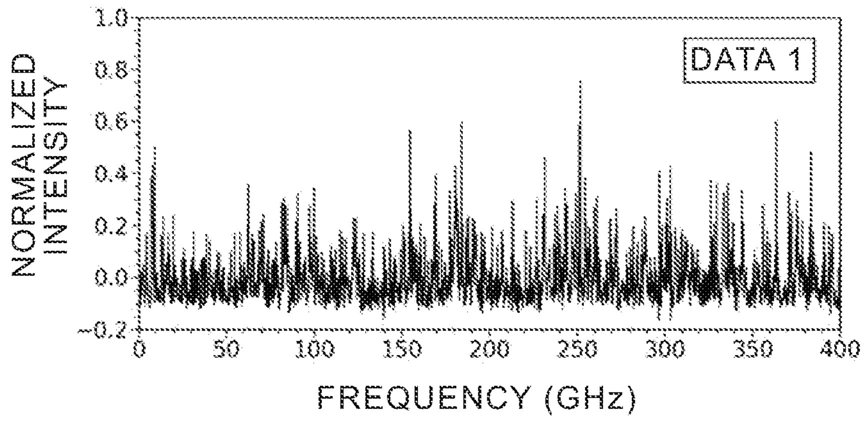
FIGS. 25A to 25C illustrate a data preparation step in another analysis method for detection adjustment for non-uniform strain.
Figure 25B:
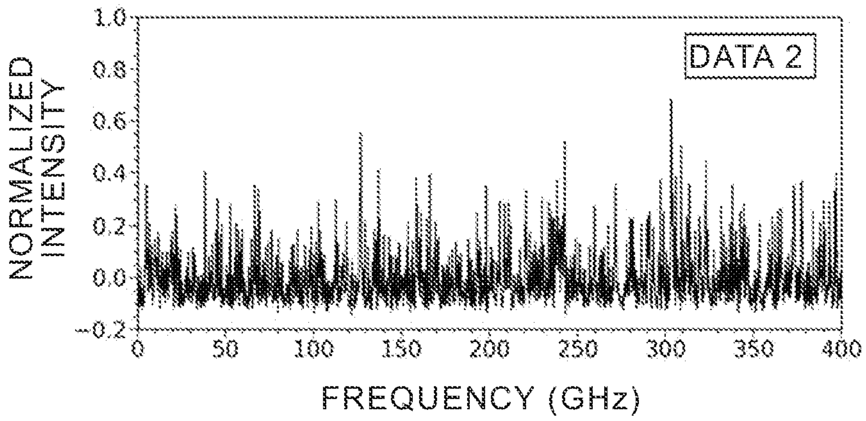
Figure 25C:
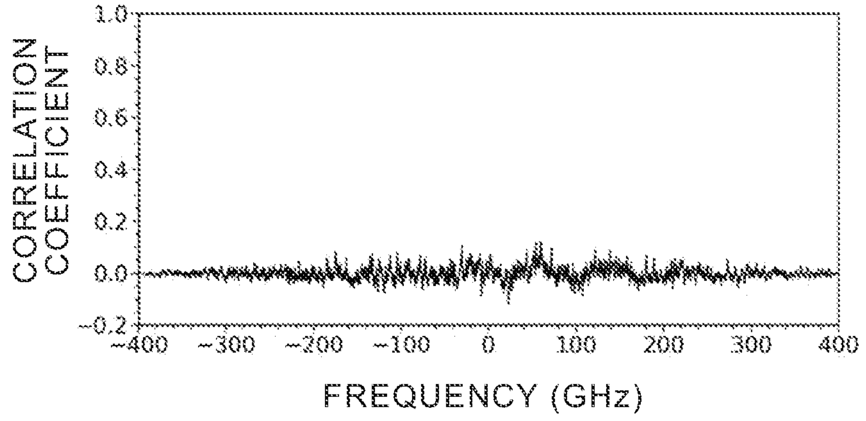

In advance, two frequency spectrum data (data 1, data 2) (see FIG. 25A, FIG. 25B) at a predetermined distance (e.g., 512.5 m) selected from raw data obtained at a non-uniformity location in the area enclosed by the dotted-line oval in FIGS. 4A and 4B are acquired, and these data are normalized. Then, if smaller strain needs to be detected, interpolation processing corresponding to plural times with respect to the frequency step is performed. For example, if the frequency step is changed from 0.2 GHz to 0.04 GHz, the minimum strain that can be detected becomes 0.264με from 1.32με, so that a smaller value can be detected. Thereafter, a cross-correlation coefficient (see FIG. 25C) is calculated. Here, for example, the data 1 is reference data, and the data 2 is measurement data. As shown in FIG. 25C, it is found that the cross-correlation coefficient exhibits a value not greater than an experientially determined threshold (0.3) and thus has not successfully been detected.

[Data Decomposition Step]

The above frequency spectrum data is considered to be a waveform containing a lot of frequency components, and a non-uniform strain distribution causes a high-frequency component that distorts the waveform so that an appropriate correlation fails to be obtained. Accordingly, in order to remove such a high-frequency component that leads to distortion of the waveform, the above signal data is decomposed using the discrete wavelet transform described below (hereinafter, the discrete wavelet transform may be referred to as DWT). This method is a normal method for decomposing a signal in signal processing.

Figure 26:
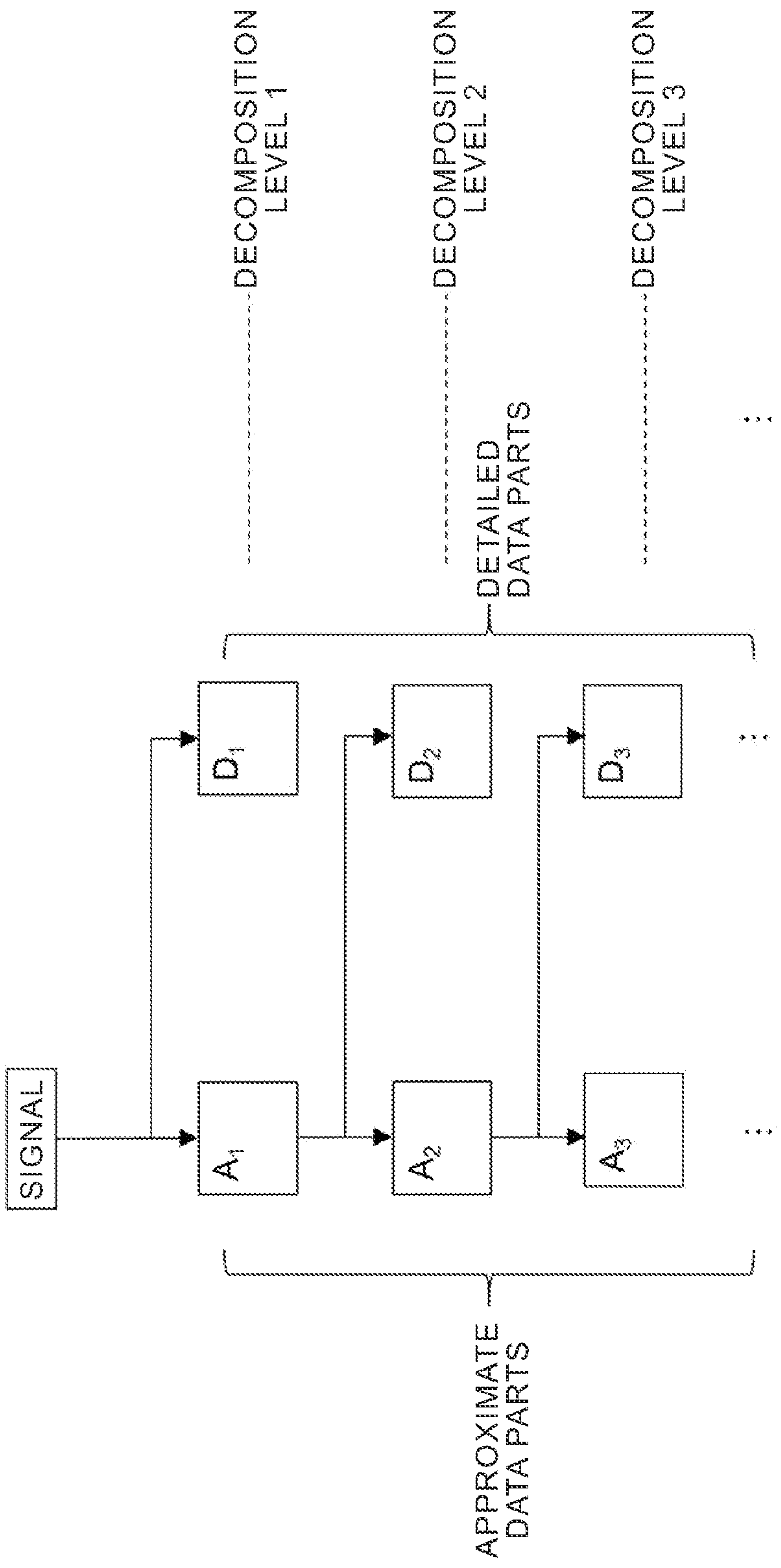
FIG. 26 illustrates a data decomposition step in the other analysis method for detection adjustment for non-uniform strain.

That is, as shown in FIG. 26, the above signal data can be separated into individual approximate data parts $A_n$ (n=1, 2, 3, . . . ) which are low-frequency parts and individual detailed data parts $D_n$ (n=1, 2, 3, . . . ) which are high-frequency parts, correspondingly to respective stages (correspondingly to respective stages at decomposition levels 1, 2, 3, . . . in the drawing).

More specifically, as shown in FIG. 26, sequentially as the level rises, each approximate data part $A_n$ (n=1, 2, 3, . . . ) can be decomposed to an approximate data part $A_{n+1}$ (n=1, 2, 3, . . . ) and a detailed data part $D_n$(n=1, 2, 3, . . . ) at a higher level. In this case, the maximum level depends on the signal length and a selected wavelet function (in wavelet transform, a wavelet function to be used needs to be selected; here, coif2 which is an orthonormal transform function was selected and used).

[Data Reconstruction Step]

Next, the detailed data parts $D_1$, $D_2$, $D_3$, . . . obtained through the above data decomposition (using the wavelet function coif2 in this case) are set at 0 (zero), whereby the detailed data parts can be easily removed. Then, using only the approximate data parts which less interfere with the detailed data parts after the detailed data parts are removed, inverse wavelet transform is performed to reconstruct data in which the detailed data parts have been removed.

By analyzing and advancing the above concept, a major processing flow for the proposed ACD method is constructed.

[Correlation Coefficient Calculation and Determination Step]

Figure 27A:
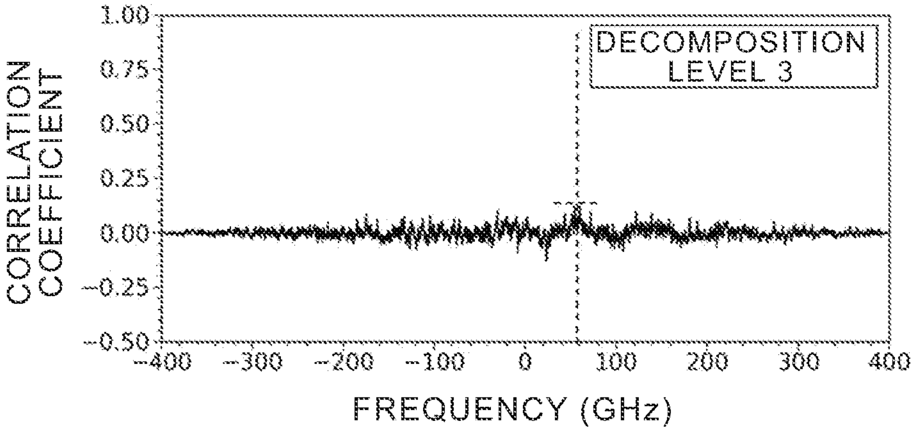
FIGS. 27A to 27C illustrate a correlation coefficient calculation and determination step in the other analysis method for detection adjustment for non-uniform strain.
Figure 27B:
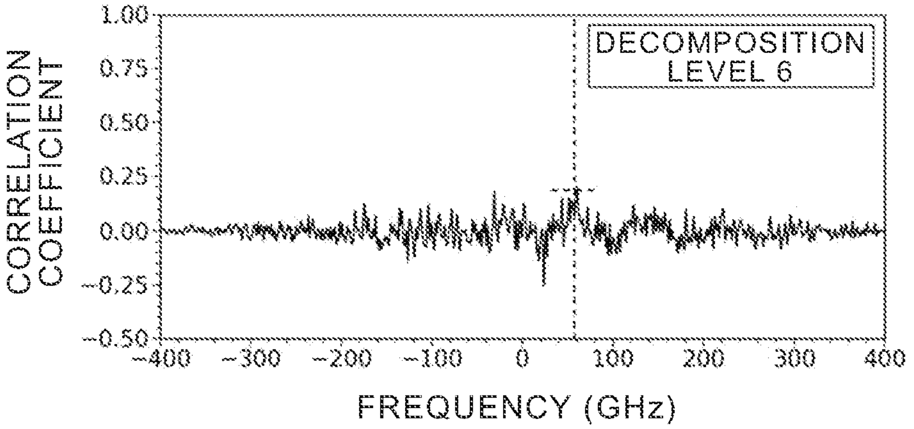
Figure 27C:
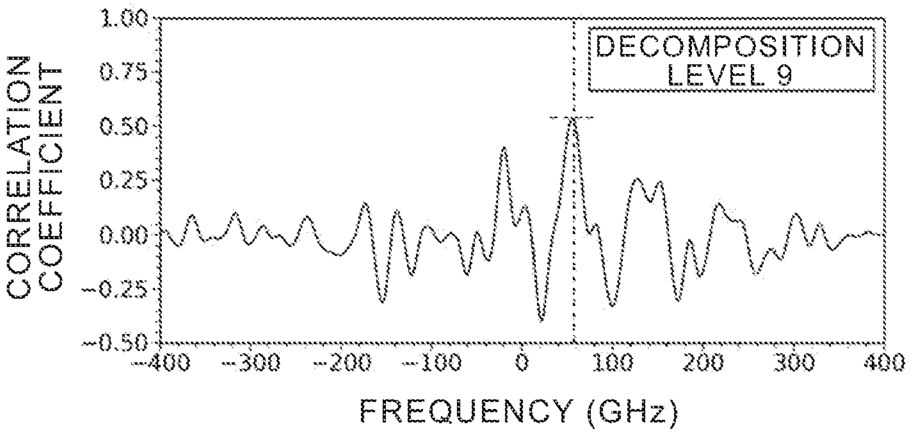

Next, on the basis of the reconstructed data (two Rayleigh spectrum data), a cross-correlation between these data is acquired and a correlation coefficient is calculated. At this time, it is necessary to note that a result of the calculated correlation coefficient differs depending on the decomposition level shown in FIG. 26 (see FIGS. 27A to 27C). As the decomposition level becomes higher, more signal data components are removed, so that the correlation coefficient becomes greater. Meanwhile, considering an actual case, it is necessary to maintain the detailed signal data as much as possible. That is, the decomposition level needs to be lowered.

Accordingly, for adjusting the level, a threshold for the correlation function is set and if the correlation coefficient exceeds the threshold, calculation for the correlation coefficient is finished. Then, RFS is calculated on the basis of the correlation coefficient determined as described above, whereby it becomes possible to measure an appropriate strain value.

Figure 28:
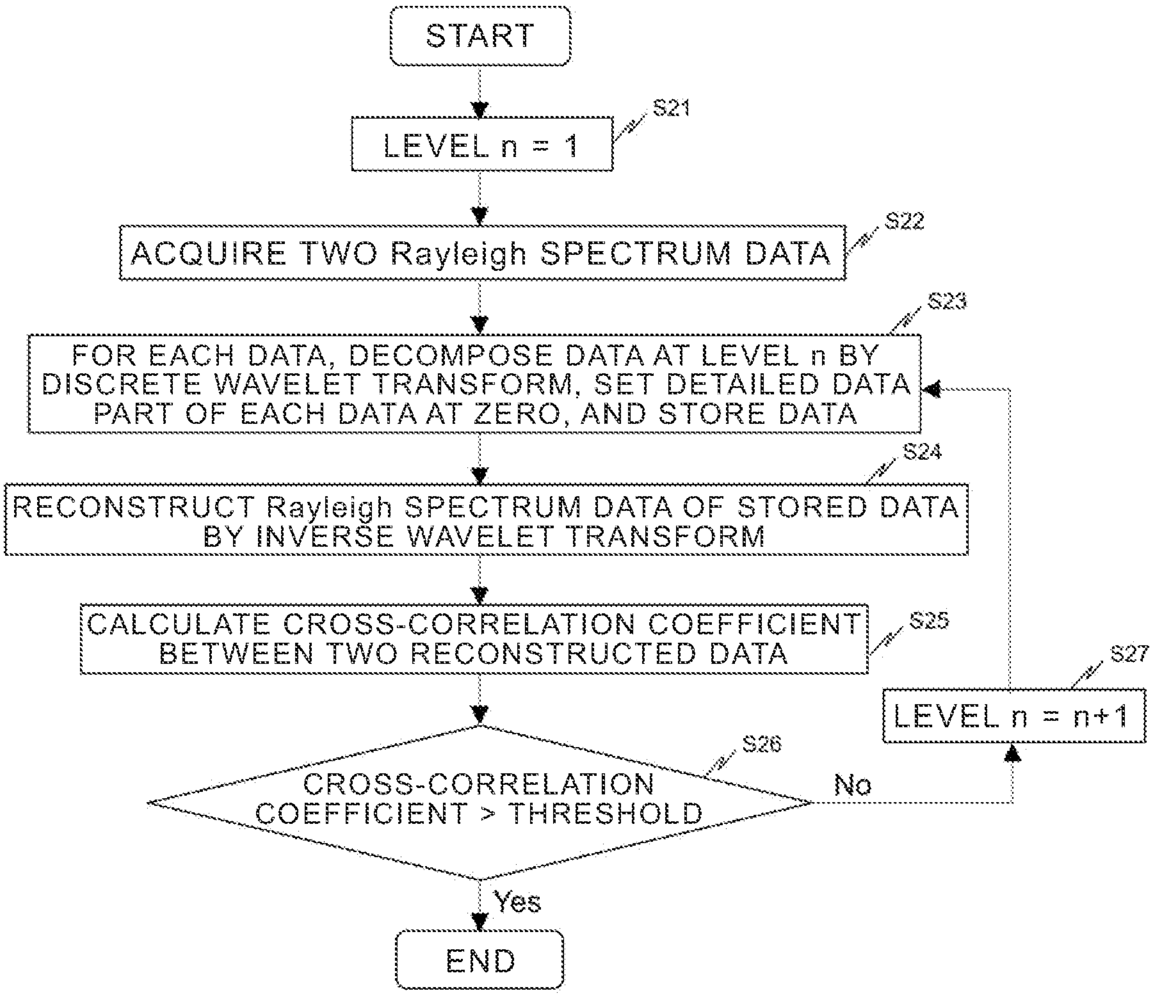
FIG. 28 is a data processing flowchart in the other analysis method for detection adjustment for non-uniform strain.

The entirety of the above process is summed up and shown as a data processing flowchart of the ACD method in FIG. 28.

First, the decomposition level n is set at 1 (step S21). Next, two Rayleigh spectrum data are acquired (step S22). Next, for each data, data at the decomposition level n is decomposed by DWT, the detailed data part of each data is set at zero, and the resultant data is stored in the memory-database (step S23). Next, by inverse wavelet transform, Rayleigh spectrum data of the above stored data is reconstructed (step S24). Then, a cross-correlation coefficient between the two reconstructed data is calculated (step S25). The calculated value of the cross-correlation coefficient is compared with the threshold (e.g., 0.4) (step S26), and if the value is greater than the threshold, the data processing is finished. On the other hand, the calculated value of the cross-correlation coefficient is smaller than the threshold, the value of n is incremented by 1 (step S27), to return to step S23 of the above processing flow, and thus the above processing from step S23 to step S27 is continued until the calculated value of the cross-correlation coefficient becomes greater than the threshold.

Through the above processing flow, decomposition of data progresses while detailed components can be maintained as much as possible. Then, for determining the value of strain at the current measurement location, the value of strain at an adjacent location is not used and the value of strain at every location can be individually processed. The above processing can save on calculation time as compared to a fundamental components decoding (FCD) method based on FFT processing described later.

Next, in order to verify the ACD method, results obtained by processing data in which non-uniform strain is detected as shown above in FIG. 4A will be described with reference to FIG. 29A and FIG. 29B.

Figure 29A:
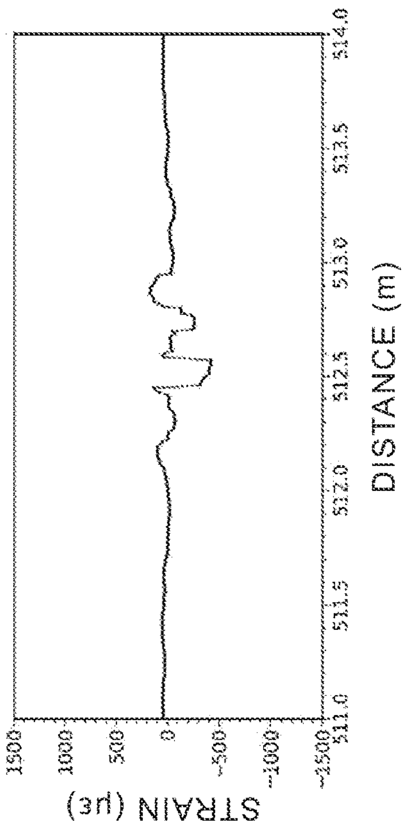
FIGS. 29A to 29D show a result obtained by processing data in which non-uniform strain is detected, using the other analysis method for detection adjustment for non-uniform strain.

FIG. 29A is a graph showing a distribution of strain that has occurred in the optical fiber with respect to an optical fiber position (corresponding to the distance indicated by the horizontal axis), which was calculated using the ACD method. In calculating the distribution of strain, 0.4 was set as the threshold here (see FIG. 28).

Figure 29B:
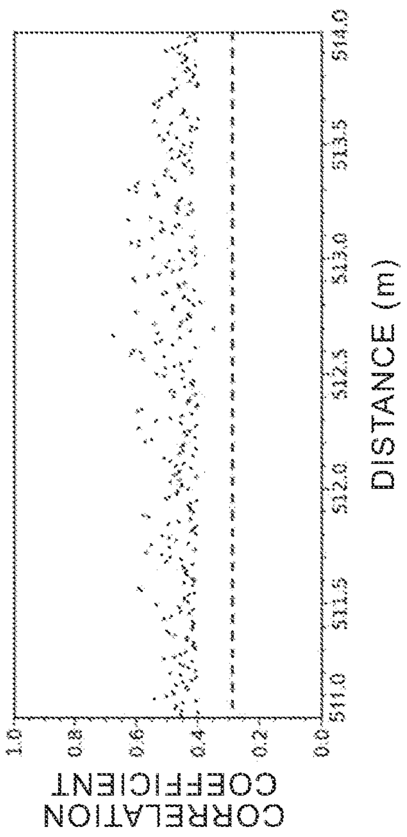
Figure 29C:
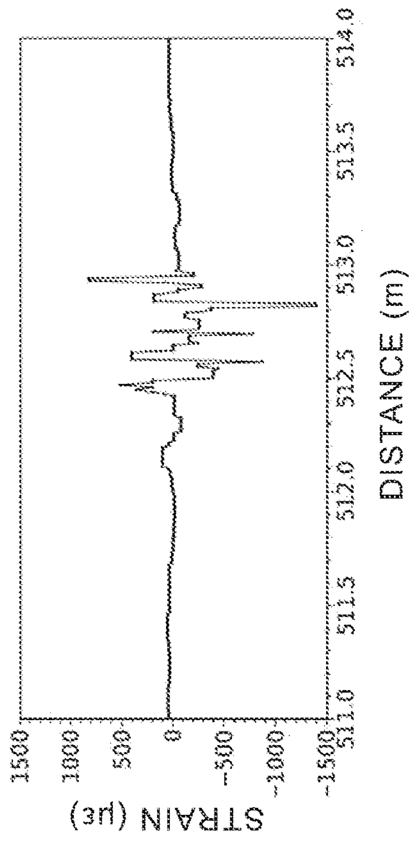
Figure 29D:
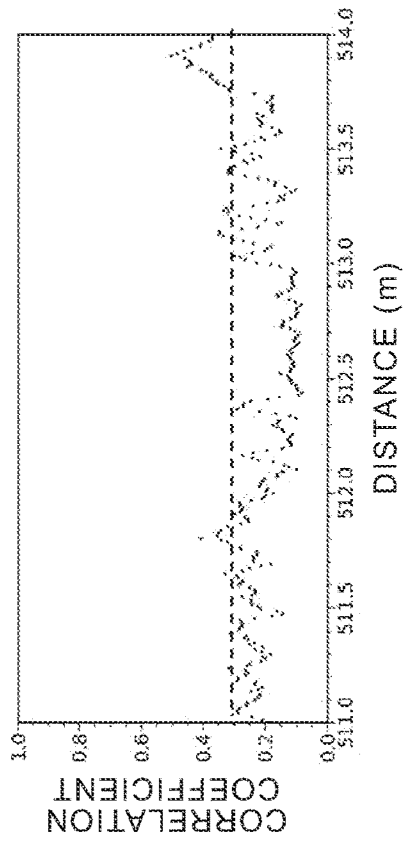

FIG. 29B shows a distribution of a correlation coefficient with respect to an optical fiber position, which was calculated using the ACD method. For reference, a graph of a strain distribution calculated by the conventional method as shown above in FIG. 4A is shown in FIG. 29C, and a distribution of a correlation coefficient corresponding thereto is shown in FIG. 29D.

From these graphs (FIG. 29A to FIG. 29D), it is found that the ACD method is effective even in a case where there is non-uniform strain. In FIG. 29B and FIG. 29D, a value of 0.3 which is experientially used as the threshold is indicated by dotted lines.

Figure 30A:
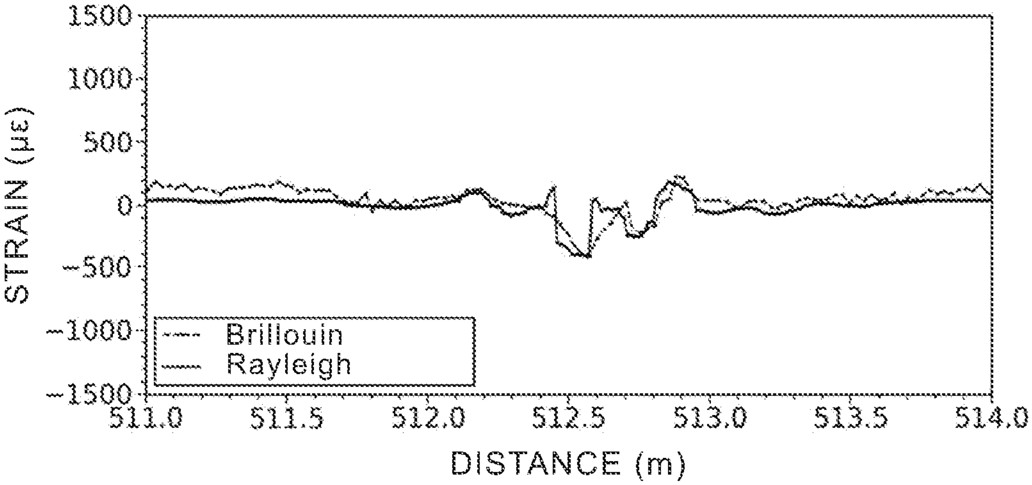
FIGS. 30A and 30B are graphs for supplemental explanation for FIG. 29.
Figure 30B:
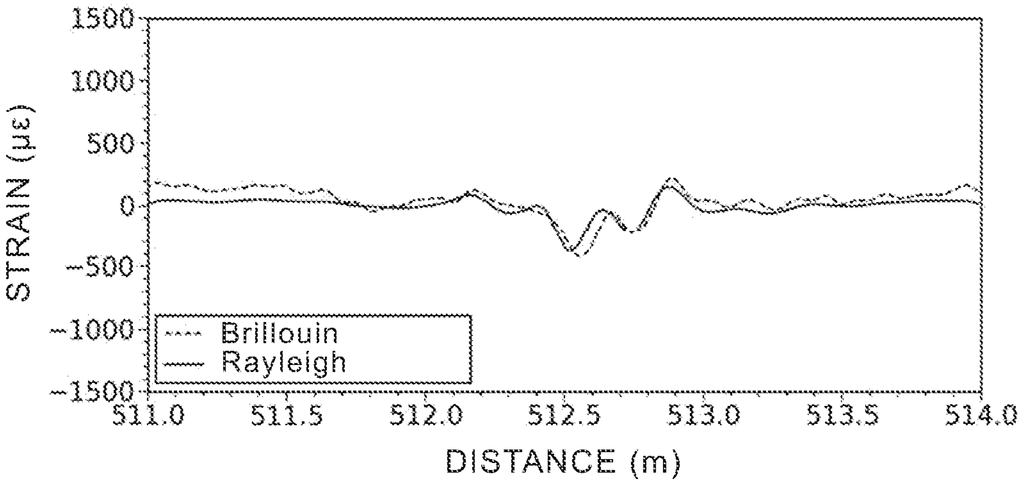

In order to verify that the ACD method is effective from another perspective, next, the strain distribution shown above in FIG. 29A is compared with data obtained using a Brillouin scattering method. Data obtained as a result are shown in FIG. 30A. Also, a graph obtained by smoothing the two kinds of data shown in FIG. 30A by a moving average method is shown in FIG. 30B.

Comparing the two kinds of data in these graphs, it is recognized that, in the strain data processed by the ACD method on the basis of Rayleigh scattering light, a strain distribution has successfully been measured equivalently as compared to the data obtained using the Brillouin scattering method.

Here, when the ACD method is applied to a location where there is non-uniform strain, the ratio of the number of points at which processing has successfully been performed to the number of all the processing points (the total number of points at which processing has successfully been performed and points at which processing has failed to be performed) is defined as a success rate (unit: %). Then, the success rate obtained for the above case exhibits a high value of 90.46%. Thus, it is found that the ACD method is effective.

[FCD Method]

As the above analysis method N2, a fundamental components decoding method (may be referred to as FCD method) which is an analysis method similar to the above ACD method will be described below. That is, instead of the ACD method, the FCD method may be used as the analysis method N2. Hereinafter, the details of the FCD method will be described focusing on difference from the ACD method.

In the ACD method, as a basic analysis method, discrete wavelet transform (DWT) is used, whereas in the FCD method, fast Fourier transform (FFT) is used. In addition, in principle, in the ACD method, approximate data parts of an RIP are extracted, whereas in the FCD method, elements in a low-frequency region of an RIP are extracted using a low-pass filter (hereinafter, may be referred to as LPF). Meanwhile, in the ACD method, it is necessary to select a wavelet function to be used, whereas in the FCD method, such selection is not needed. On the other hand, in the ACD method, an initial value is not needed, whereas in the FCD method, an initial value needs to be set. Hereinafter, the FCD method will be described in detail, in order from the above principle aspect.

Figure 31:
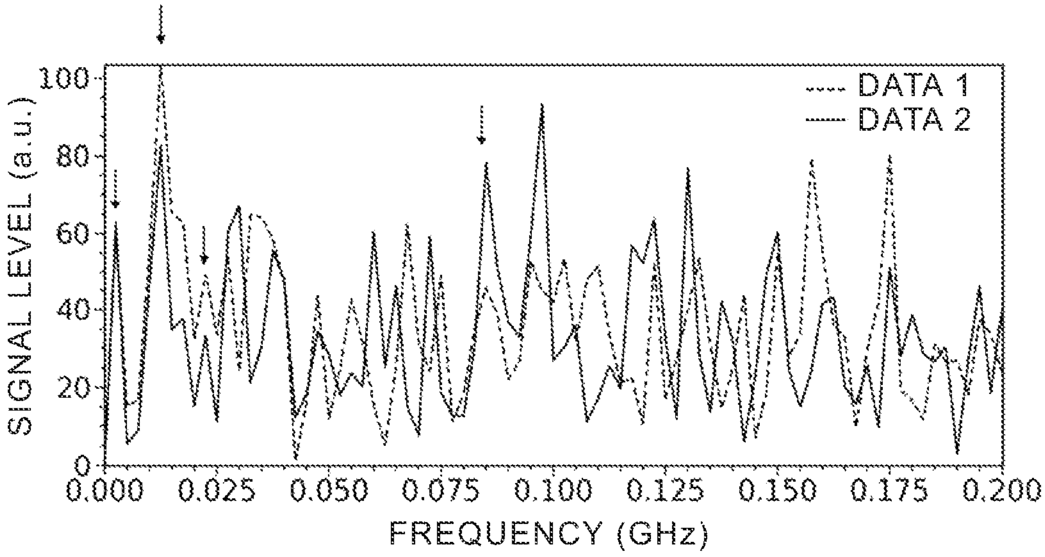
FIG. 31 illustrates a fundamental frequency component used in a method similar to the other analysis method for detection adjustment for non-uniform strain.

In a case where there is a non-uniform strain distribution in a measurement target, a Rayleigh frequency spectrum thereof has high-frequency components, which lead to distortion of a strain waveform. Meanwhile, in a case where there is obviously a correlation between two Rayleigh frequency data, as shown in an example in FIG. 31, it is considered that the spectra have, in common, fundamental components (fundamental frequency components; specifically, see frequency components at parts indicated by four arrows in the graph).

Accordingly, in the FCD method, a correlation is obtained using such common fundamental components, in particular, fundamental components in a low-frequency region. In order to obtain such common fundamental components, here, high-frequency components of a Rayleigh frequency signal are cut off using an LPF (in this case, an optimum cutoff frequency needs to be selected). At this time, as the cutoff frequency becomes lower, a correlation coefficient between the two Rayleigh frequency spectra becomes greater, and as the cutoff frequency becomes higher, a correlation coefficient between the two Rayleigh frequency spectra becomes smaller. For selecting an optimum cutoff frequency (find out an appropriate value), the following two conditions are considered. The first condition is that the correlation coefficient exceeds a predetermined threshold, and the second condition is that a shift frequency at the current observation location needs to be close to a shift frequency at the preceding observation location.

The details of processing generally described above are shown as a data processing flow in FIG. 32. Hereinafter, with reference to FIG. 32, the data processing flow in the FCD method will be described.

Figure 32:
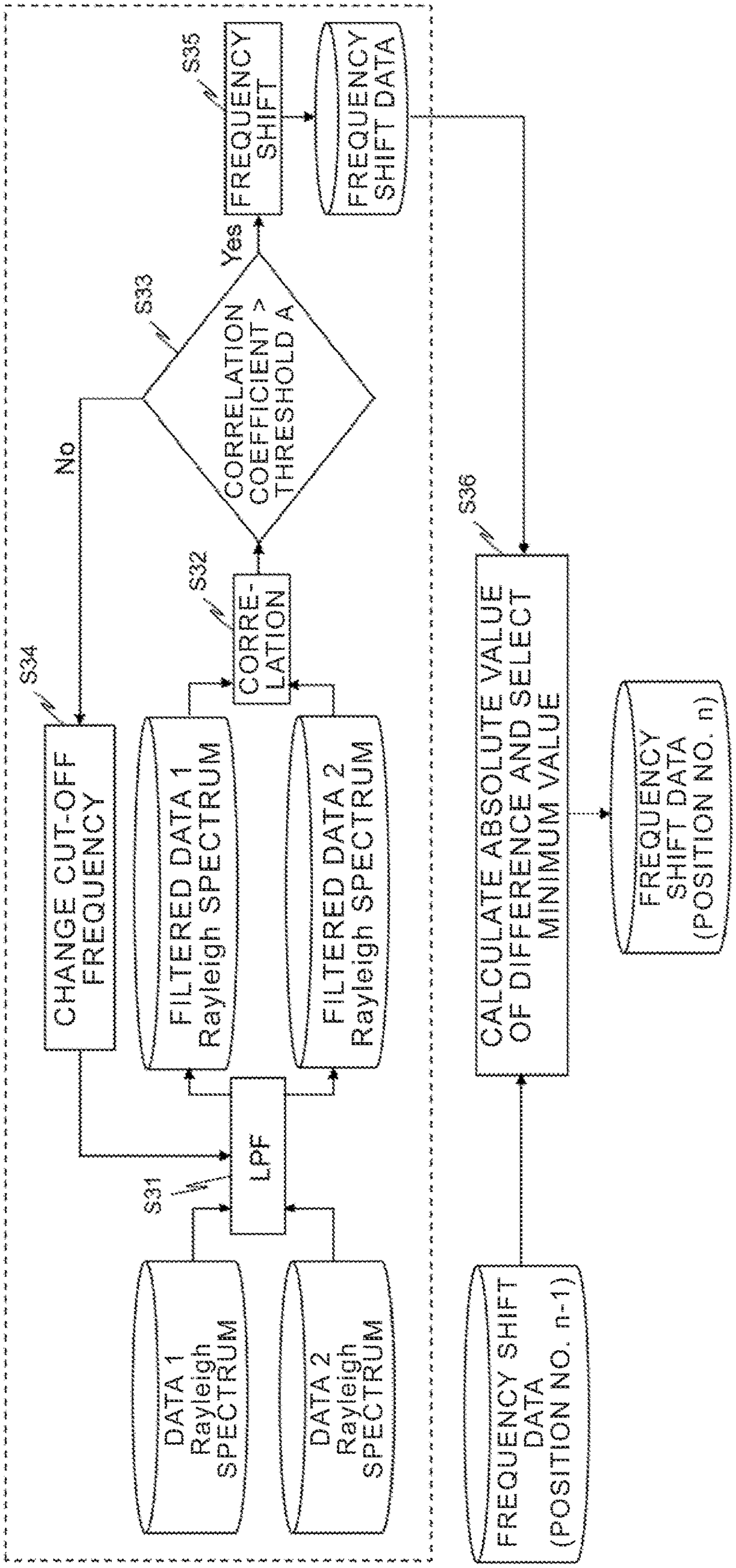
FIG. 32 shows a data processing flow used in the method similar to the other analysis method for detection adjustment for non-uniform strain.

FIG. 32 shows a processing flow for calculating a series of Rayleigh frequency shifts having higher correlation coefficients than a set threshold A. Then, these Rayleigh frequency shifts are each compared with the Rayleigh frequency shift at the preceding location (position No. n−1), and the Rayleigh frequency shift for which the absolute value of the comparison difference is minimum is selected to be used as Rayleigh frequency shift at the current location (position No. n).

Specifically, as shown in FIG. 32, two Rayleigh spectrum data (data 1, data 2) are passed through the low-pass filter (LPF) (step S31), to obtain filtered data 1 and filtered data 2, respectively, and a correlation between these two data is acquired (step S32). Subsequently, the magnitudes of a correlation coefficient obtained from the correlation and the predetermined threshold A are compared (step S33). Then, if the correlation coefficient is smaller than the predetermined threshold A, the cutoff frequency of the LPF is changed (step S34), and the two Rayleigh spectrum data (data 1, data 2) are passed through the low-pass filter (LPF) again, to obtain a correlation between filtered data 1 and filtered data 2 again and compare the correlation with the threshold A. If the correlation coefficient obtained here is equal to or greater than the predetermined threshold A, the value of Rayleigh frequency shift is calculated from the correlation coefficient at this time (step S35), and the calculated value is stored as Rayleigh frequency shift data in a memory or the like. Then, the absolute value of a difference between the previously obtained Rayleigh frequency shift data at the preceding location and the Rayleigh frequency shift data obtained through the above processing of step S31 to step S35 is calculated, and the data for which the absolute value is minimum is selected (step S36) to be used as Rayleigh frequency shift at the current location (position No. n).

Figure 33A:
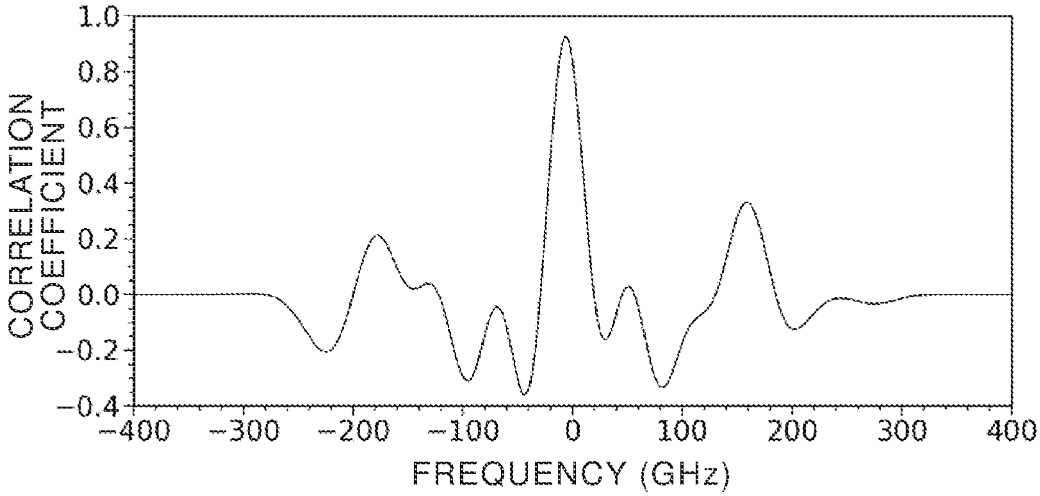
FIGS. 33A and 33B show a correlation coefficient which is an example of a result obtained by applying the method similar to the other analysis method for detection adjustment for non-uniform strain.
Figure 33B:
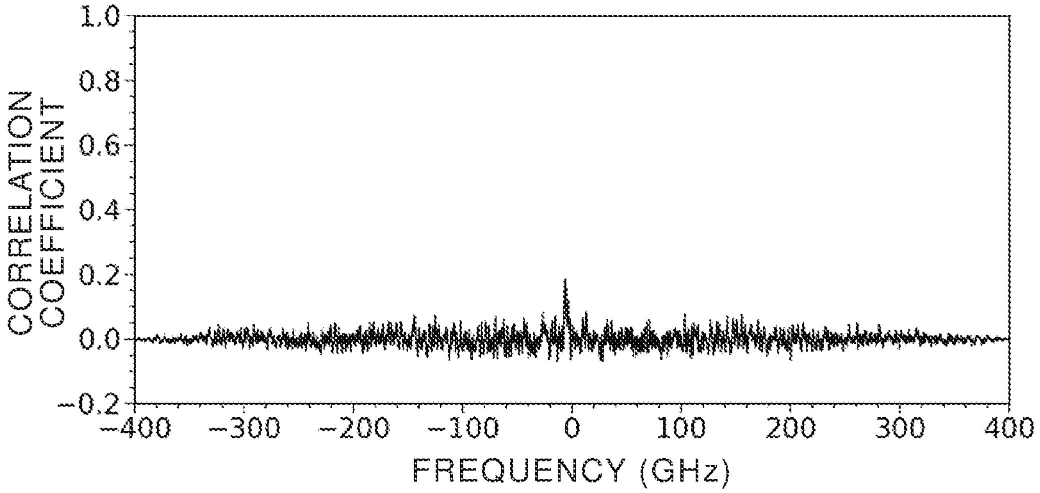

In order to set an initial value (i.e., a value at the position No. 0 in a case of n=1), processing is started from a location where Rayleigh frequency shift is known, as the initial location. FIG. 33A shows the correlation coefficient obtained through the above processing by the FCD method. For comparison, FIG. 33B shows data obtained without undergoing the processing by the FCD method. It is found that the correlation coefficient is obviously improved in the data obtained through the processing by the FCD method.

Figure 34A:
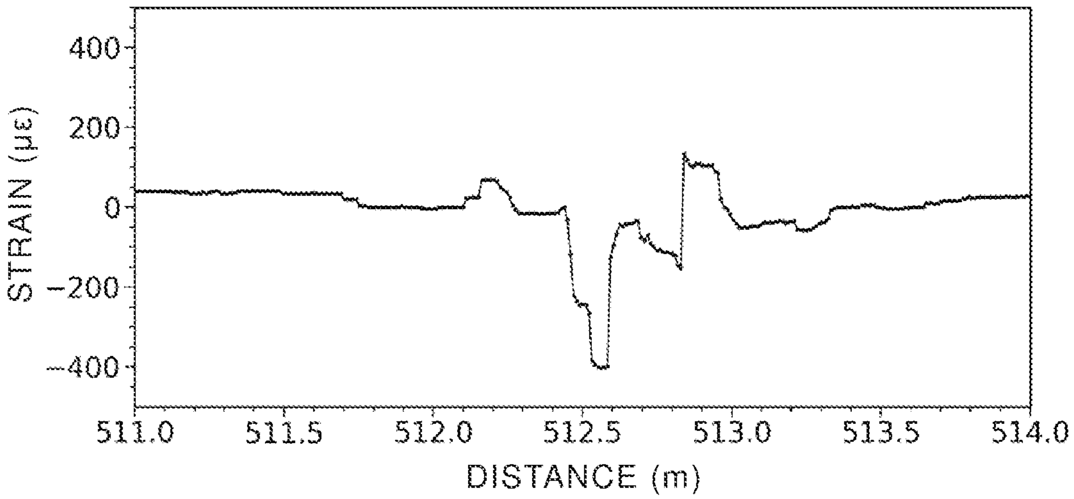
FIGS. 34A and 34B show a strain distribution which is an example of a result obtained by applying the method similar to the other analysis method for detection adjustment for non-uniform strain.
Figure 34B:
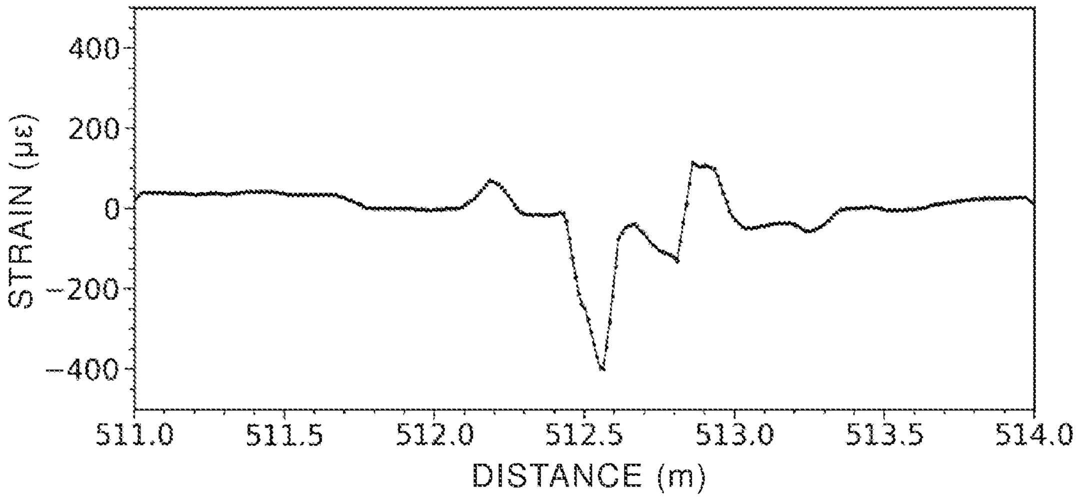
Figure 35A:
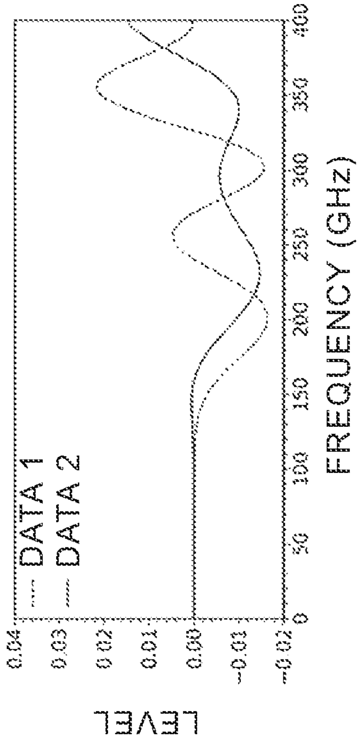
FIGS. 35A to 35D illustrate effects of the method similar to the other analysis method for detection adjustment for non-uniform strain.
Figure 35B:
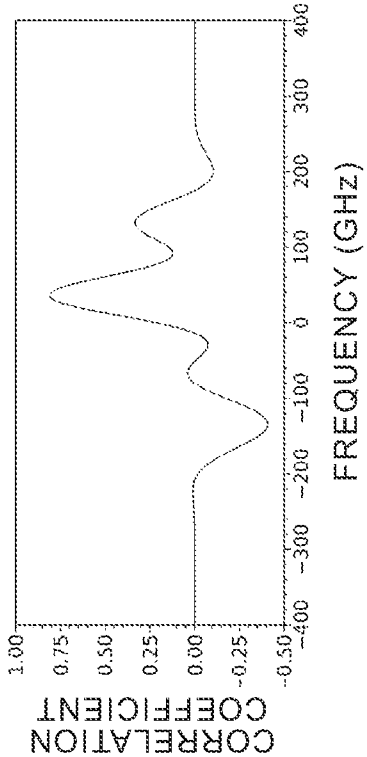
Figure 35C:
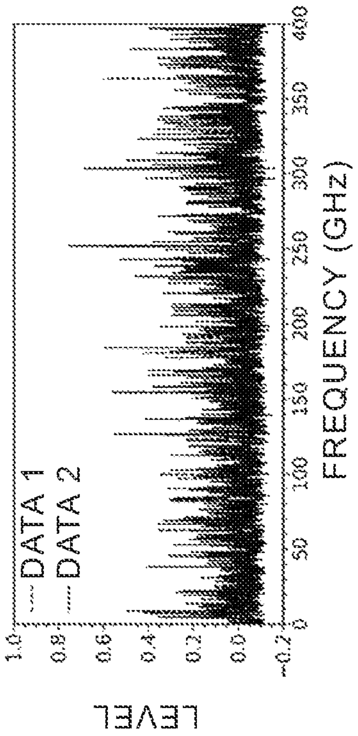
Figure 35D:
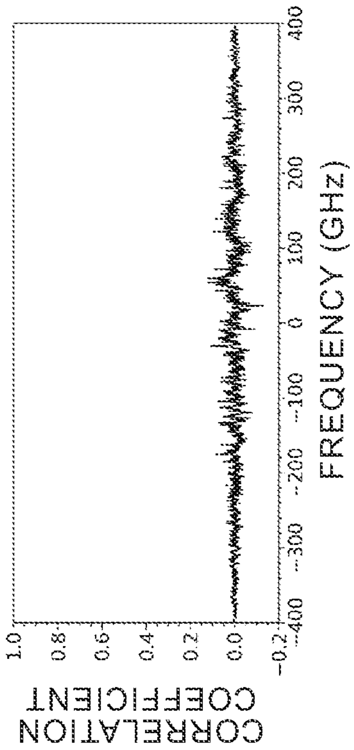

Next, on the basis of the frequency shift data obtained through the processing by the FCD method, strain distribution data at distance positions including the distance where there is non-uniform strain as described above is obtained, and the data are shown in FIG. 34A and FIG. 34B. FIG. 34A shows a result obtained by directly plotting the strain distribution data obtained through the processing by the FCD method. FIG. 34B shows data subjected to smoothing processing by taking moving averages of the data in FIG. 34A. It is found that both data exhibit significant improvement by use of the FCD method, as compared to the strain distribution data shown above in FIG. 4A. This is the same as in the ACD method described above.

Finally, in order to show an improvement effect by use of the FCD method, FIG. 35A, FIG. 35B, FIG. 35C, and FIG. 35D respectively show data of the magnitude of a spectrum and a spectrum distribution of a correlation coefficient obtained in the case of applying the FCD method, and data of the magnitude of a spectrum and a spectrum distribution of a correlation coefficient obtained in a case of not performing any processing (not applying the FCD method).

Thus, it is found that the analysis method N2 has an effect equivalent to that of the analysis method N1 described in embodiment 1. In addition, it has been described that, in the analysis method N2, the ACD method and the FCD method are both effective. Which method should be selected can be determined depending on circumstances such as the intended usage and presence/absence of given tools to be used in each method (e.g., FFT in the FCD method).

Then, even in a case of using the analysis method N2, the same effect as in embodiment 1 can be obtained.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, in the above description, strain is mainly used as a physical quantity to be measured, but the same discussion applies even if strain is replaced with temperature, and thus, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 LD
2 optical switch
3 erbium-doped fiber amplifier (EDFA)
4 optical coupler
5 reference optical fiber
6 2ch A/D converter
7 first calculation unit
8 memory-database (memory-DB)
9 second calculation unit (calculation unit)
11 light source unit
12 transmission/reception optical unit
13 reception unit
14 Rayleigh intensity pattern digital processing unit (RIP digital processing unit)
100 Rayleigh intensity pattern measurement device (RIP measurement device)

The invention claimed is:

1. A Rayleigh intensity pattern measurement device comprising:

a light source unit including a tunable-wavelength LD and a controller capable of changing a frequency of a laser beam emitted from the tunable-wavelength LD;

an optical coupler which causes the laser beam emitted from the light source unit to enter into an optical fiber and causes Rayleigh scattering light from the optical fiber to go out through a path different from an entry path of the laser beam;

a reception unit which coherently receives local light from the light source unit and the Rayleigh scattering light from the optical coupler; and a Rayleigh intensity pattern digital processing unit including an A/D converter which performs A/D conversion of a signal outputted from the reception unit, a first calculator configured to perform, by a predetermined method, calculation on the signal converted by the A/D converter, a memory-database which receives and stores the signal calculated by the first calculator, and a second calculator configured to perform-predetermined calculation on the basis of data stored in the memory-database, the Rayleigh intensity pattern digital processing unit being configured to, from two different Rayleigh intensity patterns at a predetermined measurement position obtained from an electric field signal of the Rayleigh scattering light, calculate a cross-correlation coefficient after performing predetermined correction for the measurement position by the second calculator, and store, in the memory-database, the cross-correlation coefficient in a case where the calculated cross-correlation coefficient has become equal to or greater than a predetermined threshold, and a matched filter, wherein the light source unit includes a local oscillator, an absolute frequency of the tunable-wavelength LD is controlled and the frequency of the laser beam emitted from the tunable-wavelength LD is scanned stepwise, chirp signals pulsed at respective steps are received by the reception unit and then are combined by the first calculator, each chirp signal is set using a plurality of window functions by sub-bands extracted by the matched filter, and by using center frequencies of the extracted sub-bands, the Rayleigh intensity pattern including a plurality of the sub-bands obtained by combining the sub-bands again is stored with the absolute frequency, and a strain distribution or a temperature distribution of a measurement target is determined by calculating Rayleigh frequency shift on the basis of the cross-correlation coefficient that has become equal to or greater than the predetermined threshold.

2. The Rayleigh intensity pattern measurement device according to claim 1, wherein the Rayleigh intensity pattern digital processing unit includes an FPGA or an ASIC, and the Rayleigh intensity pattern digital processing unit acquires frequency components in the sub-bands through digital processing by the first calculator, and performs resampling which is interpolation processing for a signal on a frequency axis, and calculation processing including calculation for the cross-correlation coefficient, by the second calculator.

3. The Rayleigh intensity pattern measurement device according to claim 2, wherein the frequency components in the sub-bands acquired by the first calculator are formed on the basis of a signal of the Rayleigh intensity pattern subjected to non-squaring processing and including phase information.

4. The Rayleigh intensity pattern measurement device according to claim 1, wherein the second calculator analyzes a measurement location and the Rayleigh frequency shift by a cross-correlation calculated using both of a distance and a frequency as variables at each measurement on the basis of the two Rayleigh intensity patterns.

5. A Rayleigh intensity pattern measurement method for performing Rayleigh intensity pattern measurement using the Rayleigh intensity pattern measurement device according to claim 1, wherein in a case where the calculated cross-correlation coefficient is smaller than a predetermined threshold, calculation is performed repeatedly until a cross-correlation coefficient equal to or greater than a given threshold is obtained, using a Rayleigh intensity pattern different from the Rayleigh intensity pattern calculated by the second calculator.

6. A Rayleigh intensity pattern measurement method for performing Rayleigh intensity pattern measurement using the Rayleigh intensity pattern measurement device according to claim 1, wherein in a case where the calculated cross-correlation coefficient is smaller than a predetermined threshold, on the basis of an observation spectrum obtained from an electric field of observation data and a reference spectrum obtained from an electric field of reference data of the Rayleigh scattering light, a cross-correlation coefficient for each spectrum is calculated with a frequency of the spectrum displaced, and on the basis of the cross-correlation coefficient for which the calculated cross-correlation coefficient is equal to or greater than the predetermined threshold, the strain distribution of the measurement target is detected.

7. A Rayleigh intensity pattern measurement method for performing Rayleigh intensity pattern measurement using the Rayleigh intensity pattern measurement device according to claim 1, wherein in a case where the calculated cross-correlation coefficient is smaller than a predetermined threshold, a reference spectrum obtained from an electric field of reference data of the Rayleigh scattering light is deformed with chirp signals having various chirp rates, and a cross-correlation between the deformed reference spectrum and an observation spectrum is acquired, to measure frequency shift of the Rayleigh scattering light of the measurement target.

8. A Rayleigh intensity pattern measurement method for performing Rayleigh intensity pattern measurement using the Rayleigh intensity pattern measurement device according to claim 1, wherein in a case where the calculated cross-correlation coefficient is smaller than a predetermined threshold, a frequency shift amount of Rayleigh scattering light including a slope is measured using a discrete wavelet transform method including the steps of:

decomposing data into an approximate data part and a detailed data part at a predetermined decomposition level;

reconstructing data through inverse wavelet transform with the detailed data part set at zero; and calculating a cross-correlation coefficient on the basis of the reconstructed data, to obtain such a correlation coefficient that the calculated correlation coefficient is equal to or greater than the threshold.

9. A Rayleigh intensity pattern measurement method for performing Rayleigh intensity pattern measurement using the Rayleigh intensity pattern measurement device according to claim 1, wherein in a case where the calculated cross-correlation coefficient is smaller than a predetermined threshold, regarding a prescribed measurement location, two Rayleigh spectrum data are passed through a low-pass filter, a correlation between the two Rayleigh spectrum data that have passed through the low-pass filter is taken, and then magnitudes of the obtained correlation coefficient and another threshold different from the predetermined threshold are compared, if the correlation coefficient is smaller than the other threshold, a cutoff frequency of the low-pass filter is changed, the two Rayleigh spectrum data are passed through the low-pass filter again, a correlation between the two Rayleigh spectrum data that have passed through the low-pass filter is taken, and the obtained correlation coefficient is compared with the other threshold, and if the obtained correlation coefficient is equal to or greater than the other threshold, a value of the Rayleigh frequency shift is calculated from the obtained correlation coefficient and stored into the memory-database, and in addition, a plurality of absolute values of differences between data of the Rayleigh frequency shift stored this time and data of the Rayleigh frequency shift stored before the data of the Rayleigh frequency shift stored this time are calculated, and the Rayleigh frequency shift for which the absolute value is smallest among the calculated absolute values is selected to be used as the Rayleigh frequency shift for the prescribed measurement location.

10. The Rayleigh intensity pattern measurement device according to claim 1, wherein the second calculator analyzes a measurement location and the Rayleigh frequency shift by a cross-correlation calculated using both of a distance and a frequency as variables at each measurement on the basis of the two Rayleigh intensity patterns.

11. The Rayleigh intensity pattern measurement device according to claim 1, wherein the second calculator analyzes a measurement location and the Rayleigh frequency shift by a cross-correlation calculated using both of a distance and a frequency as variables at each measurement on the basis of the two Rayleigh intensity patterns.

12. The Rayleigh intensity pattern measurement device according to claim 2, wherein the second calculator analyzes a measurement location and the Rayleigh frequency shift by a cross-correlation calculated using both of a distance and a frequency as variables at each measurement on the basis of the two Rayleigh intensity patterns.

13. The Rayleigh intensity pattern measurement device according to any one of claim 5, wherein the second calculator analyzes a measurement location and the Rayleigh frequency shift by a cross-correlation calculated using both of a distance and a frequency as variables at each measurement on the basis of the two Rayleigh intensity patterns.

* * * * *